US008244549B1

(12) United States Patent
Stener

(10) Patent No.: US 8,244,549 B1
(45) Date of Patent: Aug. 14, 2012

(54) METHOD AND SYSTEM FOR PROVIDING AND MANAGING A FRACTIONAL AIRCRAFT OWNERSHIP PROGRAM

(75) Inventor: Gavin Stener, Dallas, TX (US)

(73) Assignee: SJS Holdings, LLC, Dallas, TX (US)

( * ) Notice: Subject to any disclaimer, the term of this patent is extended or adjusted under 35 U.S.C. 154(b) by 2276 days.

(21) Appl. No.: 10/122,644

(22) Filed: Apr. 11, 2002

(51) Int. Cl.
G06Q 10/00 (2012.01)
G06Q 50/00 (2012.01)

(52) U.S. Cl. ............................................. 705/1.1; 705/6
(58) Field of Classification Search ................ 705/1, 1.1, 705/6
See application file for complete search history.

(56) References Cited

U.S. PATENT DOCUMENTS

| | | | |
|---|---|---|---|
| 4,360,875 A * | 11/1982 | Behnke ....................... | 455/456.5 |
| 5,237,614 A | 8/1993 | Weiss | |
| 5,903,721 A | 5/1999 | Sixtus | |
| 6,094,721 A | 7/2000 | Eldridge et al. | |
| 6,246,769 B1 | 6/2001 | Kohut | |
| 6,711,548 B1 | 3/2004 | Rosenblatt | |
| 2001/0039514 A1 | 11/2001 | Barenbaum et al. | |
| 2001/0053989 A1 | 12/2001 | Keller et al. | |
| 2002/0010604 A1 | 1/2002 | Block | |
| 2002/0077874 A1 | 6/2002 | Dakin | |
| 2002/0122055 A1 | 9/2002 | Parupudi et al. | |
| 2002/0156661 A1 | 10/2002 | Jones et al. | |
| 2002/0194037 A1 * | 12/2002 | Creed et al. ........................ | 705/5 |
| 2003/0033164 A1 | 2/2003 | Faltings et al. | |
| 2003/0034958 A1 | 2/2003 | Waesterlid et al. | |
| 2003/0055689 A1 | 3/2003 | Block et al. | |
| 2003/0135423 A1 | 7/2003 | Daum | |
| 2003/0139950 A1 | 7/2003 | Daum | |
| 2003/0140025 A1 | 7/2003 | Daum | |
| 2003/0225600 A1 | 12/2003 | Slivka et al. | |
| 2003/0229573 A1 | 12/2003 | Southland | |
| 2004/0030659 A1 | 2/2004 | Gueh | |
| 2004/0039614 A1 | 2/2004 | Maycotte et al. | |
| 2004/0225880 A1 | 11/2004 | Mizrah | |
| 2005/0027614 A1 | 2/2005 | McKelvey | |
| 2005/0044004 A1 | 2/2005 | McKelvey | |
| 2006/0136317 A1 | 6/2006 | Mizrah | |

FOREIGN PATENT DOCUMENTS

WO    WO 01/71619 A1    9/2001

OTHER PUBLICATIONS

"Aviation Advisor", Jul. 18, 2001, from www.zsrlaw.com, 6 pages.*
Electronic Code of Federal Regulations, Title 14, Parts 121 and 135.
Keskinocak, Pinar, "Corporate High Flyers," Dec. 1999, ORMS Today.

* cited by examiner

Primary Examiner — Dennis Ruhl
(74) Attorney, Agent, or Firm — D. Scott Hemingway; Hemingway & Hansen, LLP

(57) ABSTRACT

A method and system for providing fractional ownership of an aircraft. The method includes operating the aircraft under an FAA certification that permits the sale of aircraft capacity. Fractional owners of the aircraft, at least one of the fractional owners may be a syndicate having multiple members. The syndicate members may be managed on behalf of the syndicate. One FAA certification that permits the sale of aircraft capacity includes FAR Part 135. Additionally, the syndicate members may be billed usage fees on behalf of the syndicate, where the usage fees are billed proportional to use of the aircraft. Available capacity of the aircraft may be resold to other fractional owners and syndicate members.

55 Claims, 16 Drawing Sheets

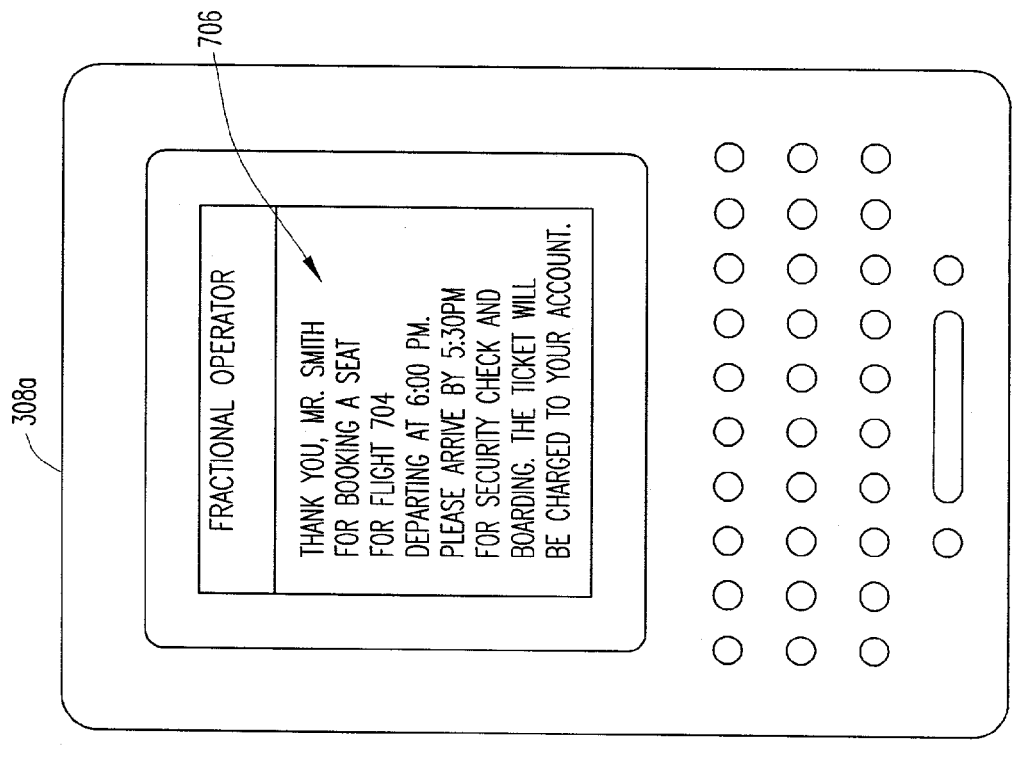
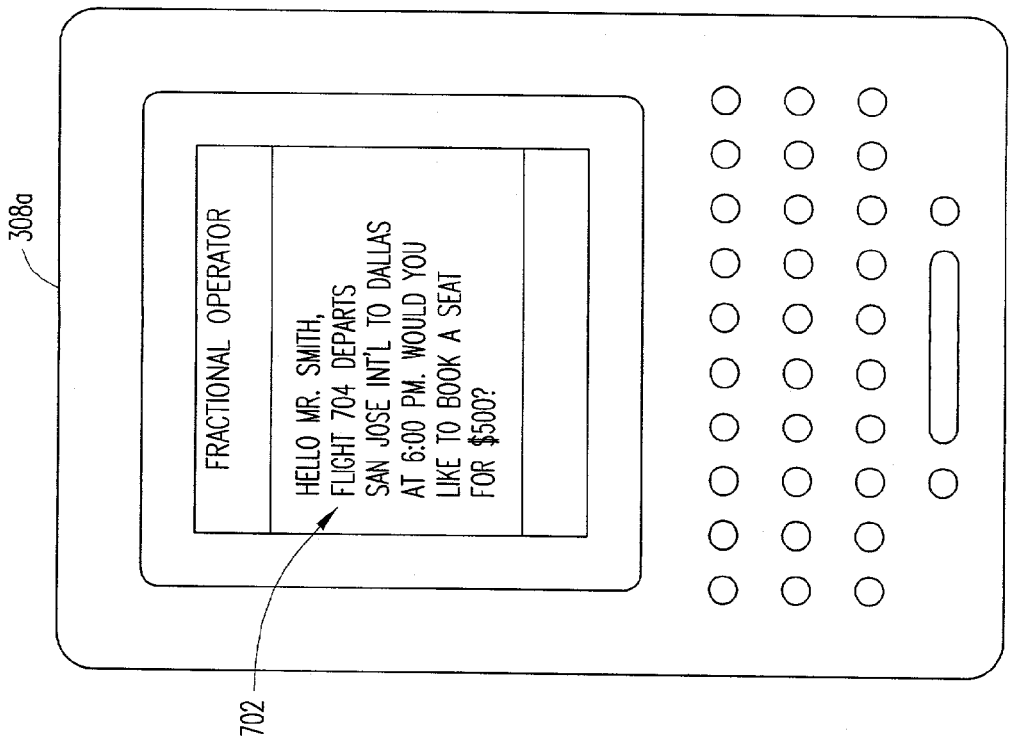
FIG. 7B
FIG. 7A

METHOD AND SYSTEM FOR PROVIDING AND MANAGING A FRACTIONAL AIRCRAFT OWNERSHIP PROGRAM

BACKGROUND OF THE INVENTION

1. Technical Field of the Invention

The principles of the present invention generally relate to aircraft ownership and services, and, more specifically, but not by way of limitation, to fractional ownership of an aircraft and management thereof.

2. Description of Related Art

There are a diverse variety of aircraft travelers that range from business to tourist travelers. To accommodate this variety of aircraft travelers, the airline industry has evolved to satisfy the needs of the travelers. Commercial airline companies have formed and expanded the capacity of a wide range of air travel routes to accommodate the requirements of business and pleasure travelers. However, more affluent travelers, such as business executives, have sought less general commercial means of aircraft travel, including charter aircraft services and aircraft fractional ownership services.

Each of the aircraft travel services (i.e., commercial, charter, and fractional ownership) are regulated by the Federal Aviation Administration (FAA). Commercial airlines operate under a Federal Aviation Regulation (FAR) Part 121 certification, charter airlines services operate under a FAR Part 135 certification, and fractional ownership services generally operate under a FAR Part 91 certification. In general, the rules governing the commercial airlines are the most stringent because the general public is involved; the rules governing charter airline services are less stringent, but still rigorous, because charter airline services operate basically as an air taxi service for the public; and the rules governing the fractional ownership operators is even less stringent because fractional ownership is sufficiently private in nature.

The different aircraft travel services have strengths and weaknesses. For the purposes of the discussion at-hand, the strengths and weaknesses are considered from the point-of-view of business travelers, high-end travelers (e.g., those who seek high quality air travel service, such as first class), and those seeking to avoid commercial airline travel.

Commercial airline travel has become increasingly difficult, inconvenient, and costly in recent years. As the commercial airline industry has grown to the point that air travel is affordable to most people, generally if planned in advance, airport congestion has resulted in delays at ticket counters, security checkpoints, boarding and de-boarding, and luggage retrieval. The increase in security measures practically mandates early airport arrival of two or more hours, which makes business traveling exceedingly challenging and problematic. Furthermore, due to a decrease in flight schedules (e.g., travel routes and times) by commercial airlines for profitability concerns, business travelers who want to make a one day trip to another large city or remote city can no longer do so due to the decreased flight schedules and airport congestion.

Business travelers have suffered a significant loss in productivity and increase in expense as one-day or longer trips require longer "down time" and additional hotel, vehicle, and meal accommodations, for example. Because of the commercial business practices, last minute travel plans dramatically increase the cost of airfares. For medium range flights (e.g., 1,000 to 2,000 miles), the cost of a coach fare ticket can be $2,000 or more. Such ticket prices often become cost prohibitive, especially if two or more business associates require travel.

Charter aircraft services provide an alternative for those seeking air travel service other than commercial airline services. Charter aircraft services essentially provide air travel taxi services. While the charter aircraft services may provide convenience, in general, aircraft charter prices are costly and airplane maintenance, pilot skill, and other passenger identity and backgrounds are unknown variables of concern by a charter aircraft passenger. On the whole, aircraft charter prices tend to be expensive due to the aircraft typically being chartered by much less than a full capacity of passengers. And, due to the nature of aircraft travel, the aircraft often flies the return trip without passengers, known in the industry as a "dead-head". Furthermore, the passengers must fly with pilots with whom they are unfamiliar and who have unknown training and experience. The cost and unknown variables for utilizing charter aircraft services tend to impose barriers for potential passengers from cost, emotional, and security standpoints.

Fractional ownership of an aircraft has become a growing industry in response to lowered aircraft prices, increased affluence of the population, increased airport congestion, and reduced commercial airline services. Fractional aircraft ownership basically allows more than one owner to time-share aircraft usage and split purchase and ownership fees. Typically, fractional aircraft operators charge the fractional owners fixed and monthly fees, where the fixed fees cover hanger costs, maintenance costs, operational management costs, and pilot salaries, for example, and the variable fees cover usage expenses, such as fuel and maintenance expenses, including scheduled and hourly.

Often, fractional owners of the aircraft do not fully utilize their monthly or yearly usage portion and, thus, spend excess money. Additionally, the fractional owners receive requests from business associates, friends, or family to utilize unused monthly air travel service. The FAR Part 91 certification, however, does not provide for anyone other than the fractional owners to utilize the aircraft and pay for the usage, including other passengers paying the owner directly for usage other than as permissible under FAR guidelines. For example, currently under FAR Part 91.501(d), certain expenses, such as fuel, may be recovered from a non-fractional owner passenger. In other words, under a FAR Part 91 certificate, neither the fractional aircraft operator nor the owner can recover monies to offset monthly management fees and the like paid by the fractional owner.

As is the case with the charter aircraft services, possibly even more so, a fractionally owned aircraft quite often (i) flies an originating flight far below capacity, (ii) returns to its home location without passengers, (iii) returns to pick up the fractional owner without passengers, and (iv) returns to its home location below capacity. While fractional operators strive to maximize usage and capacity of the aircraft by routing schedules to pickup other fractional owners, the average number of passengers of a fractionally owned aircraft is 2.8 (note, the typical business jet aircraft is eight seats). The costs and expenses that the fractional operator incurs due to flying below capacity and dead-head flights simply is passed through to the fractional owners in the form of fixed and variable monthly fees. These fixed and monthly fees tend to be cost prohibitive for many potential fractional owners who desire the benefits of such aircraft services. And, unless the fractional operator continues to sell fractional aircraft ownership shares to new owners, the current fractional ownership business model for servicing new and existing fractional owners shows limited growth potential.

Often times, to utilize a fractionally owned aircraft to generate revenue during times that the aircraft would otherwise be idle, the fractional owner allows a separate charter aircraft service to operate the aircraft under a FAR Part 135 certification. While this practice allows the aircraft to generate some revenue, the owner essentially loses operational command and control of his aircraft while the aircraft is under the control of the charter service. The fractional owners aircraft are generally flown by pilots of unknown skill and qualifications, customers that are of unknown origin that have not undergone any security clearance and the owner has no control of what the aircraft carries in terms of passengers and cargo.

SUMMARY OF THE INVENTION

To overcome the problem of fractional ownership of an aircraft being cost prohibitive and to avoid the unknown variable issues of charter aircraft services (e.g., unknown pilots, security concerns, etc.), a method and system for managing fractional ownership of an aircraft operating under an FAA certification (e.g., FAR Part 135) that permits the sale of aircraft capacity is provided. By operating the fractionally owned aircraft under such a certification, a fractional aircraft operator may charge an allocated capacity fee to an entity who is not a fractional owner who booked the flight.

A fractional owner of the aircraft may be a syndicate formed of multiple members (e.g., business entities and individuals). By forming a syndicate under a FAR Part 135, the syndicate members may be billed proportional to usage of the aircraft.

In one embodiment, the fractional aircraft operator apportions usage fees on behalf of the fractional owners. The fractional owners and syndicate members may nominate individuals (nominated members) who may share flight time of the nominating fractional owners and/or syndicate members. The nominated members may share in usage and be billed by the fractional operator on a per seat basis. The fractional owners and syndicate members notify the fractional operator as to a desire to share flights and may set the price for the fractional operator to sell the available seats on behalf of the fractional owners and syndicate(s) if the flights are shared. The available seats may be marketed by the fractional operator to the other fractional owners and syndicate members. For command and control purposes, as understood in the art, and for safety concern issues, background checks of the fractional owners, syndicate members, and nominated members may be performed. By filling the available capacity of the aircraft, the fractional owners and fractional operator may derive a financial benefit to help offset costs and expenses of owning and operating the aircraft without having to place the aircraft into a separate management infrastructure (e.g., charter service) as is currently performed.

One embodiment according to the principles of the present invention includes a method and system for providing fractional ownership of an aircraft. The method includes operating the aircraft under an FAA certification that permits the sale of aircraft capacity. Fractional owners of the aircraft, at least one of the fractional owners may be a syndicate having multiple members. The syndicate members may be managed on behalf of the syndicate. One FAA certification that permits the sale of aircraft capacity includes FAR Part 135. Additionally, the syndicate members may be billed usage fees on behalf of the syndicate, where the usage fees are billed proportional to use of the aircraft. Available capacity of the aircraft may be resold to other fractional owners and syndicate members.

BRIEF DESCRIPTION OF THE DRAWINGS AND TABLES

A more complete understanding of the method and apparatus of the present invention may be obtained by reference to the following Detailed Description when taken in conjunction with the accompanying Drawings and Tables, wherein.

Figure 1:
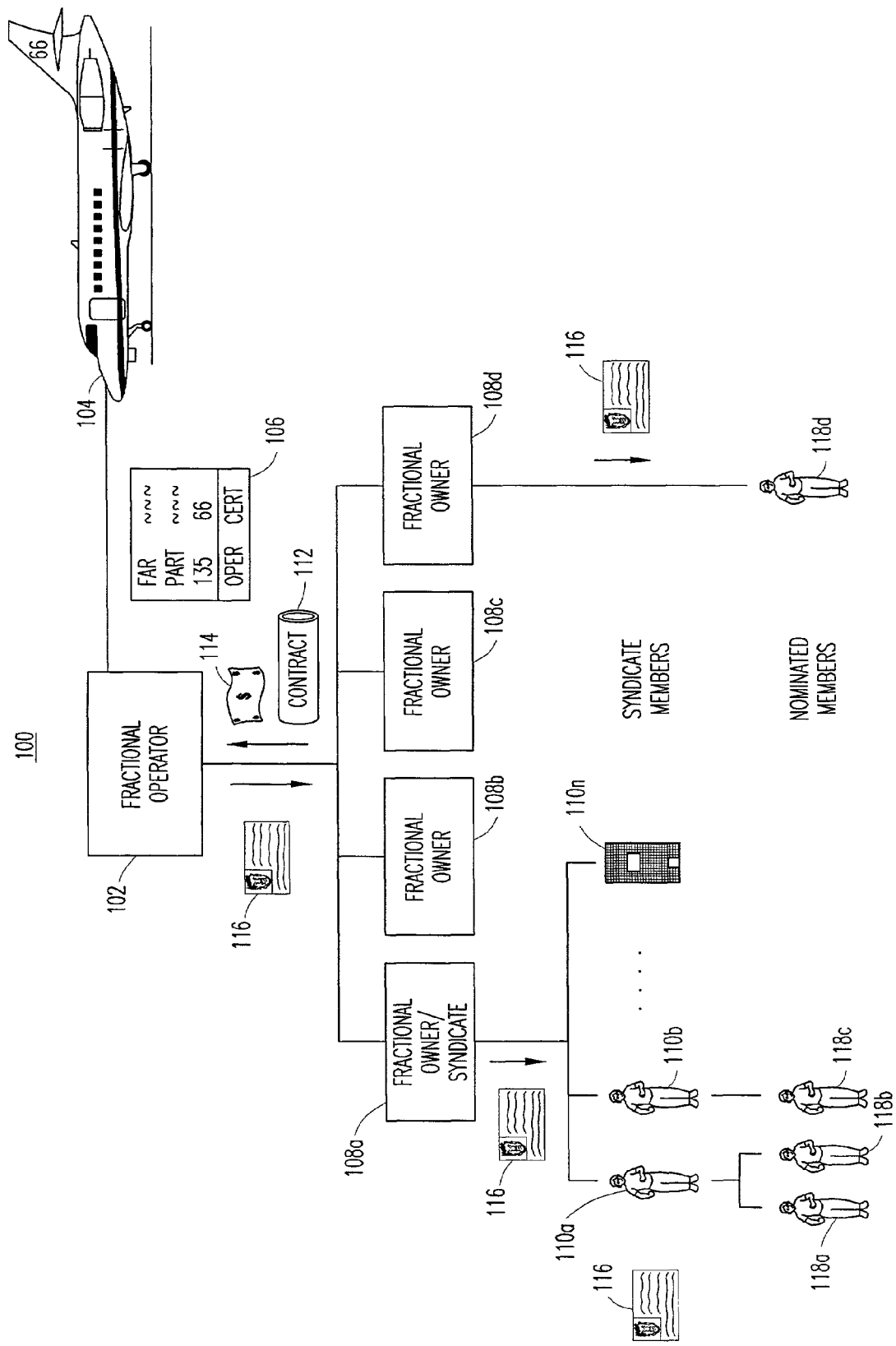
FIG. 1 is an exemplary block diagram of a system for providing and managing a fractional aircraft ownership program in accordance with the principles of the present invention.
Figure 3:
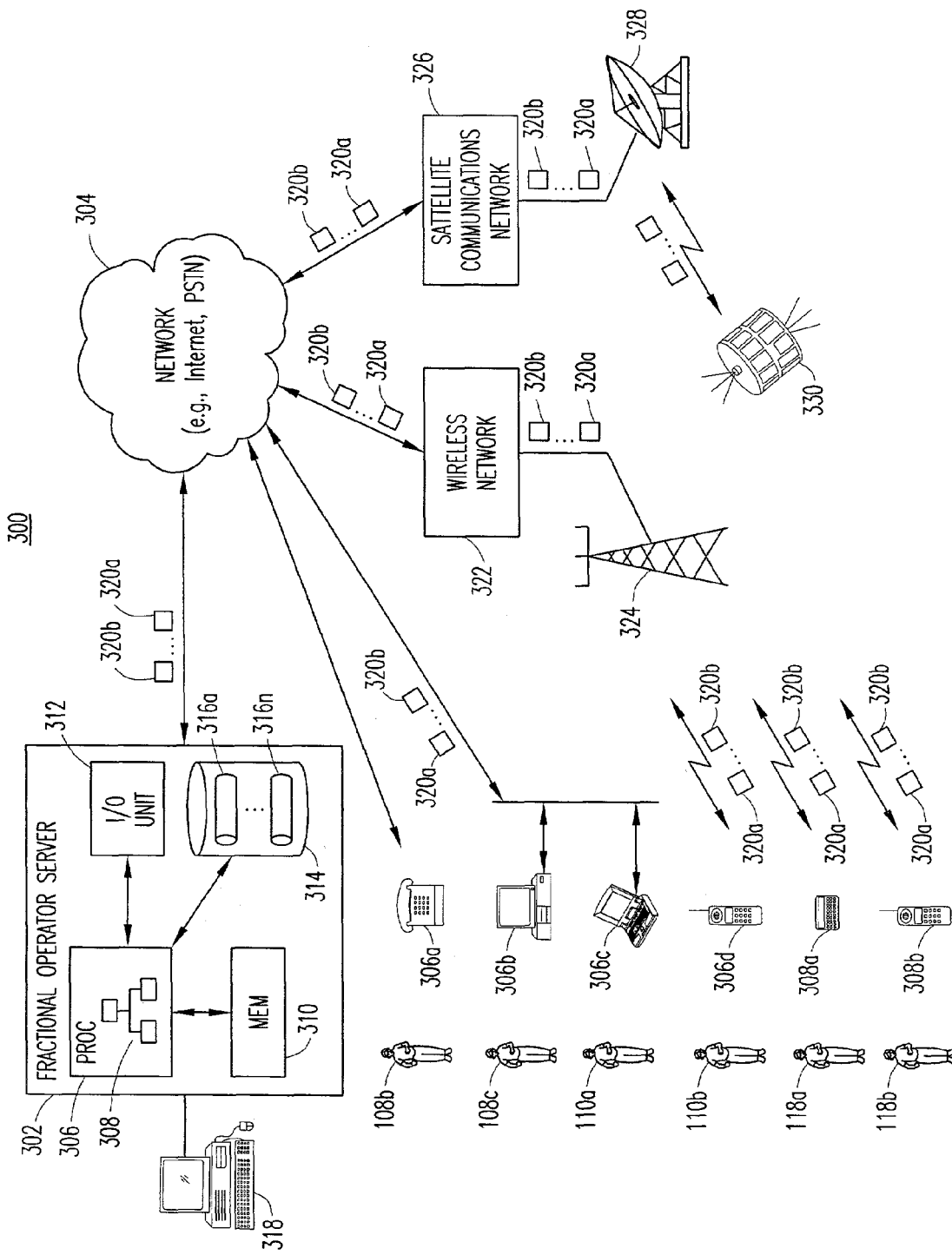
FIG. 3 is an exemplary system block diagram that illustrates technical infrastructure for providing management of the fractional aircraft ownership program according to FIG. 1.
Figure 5:
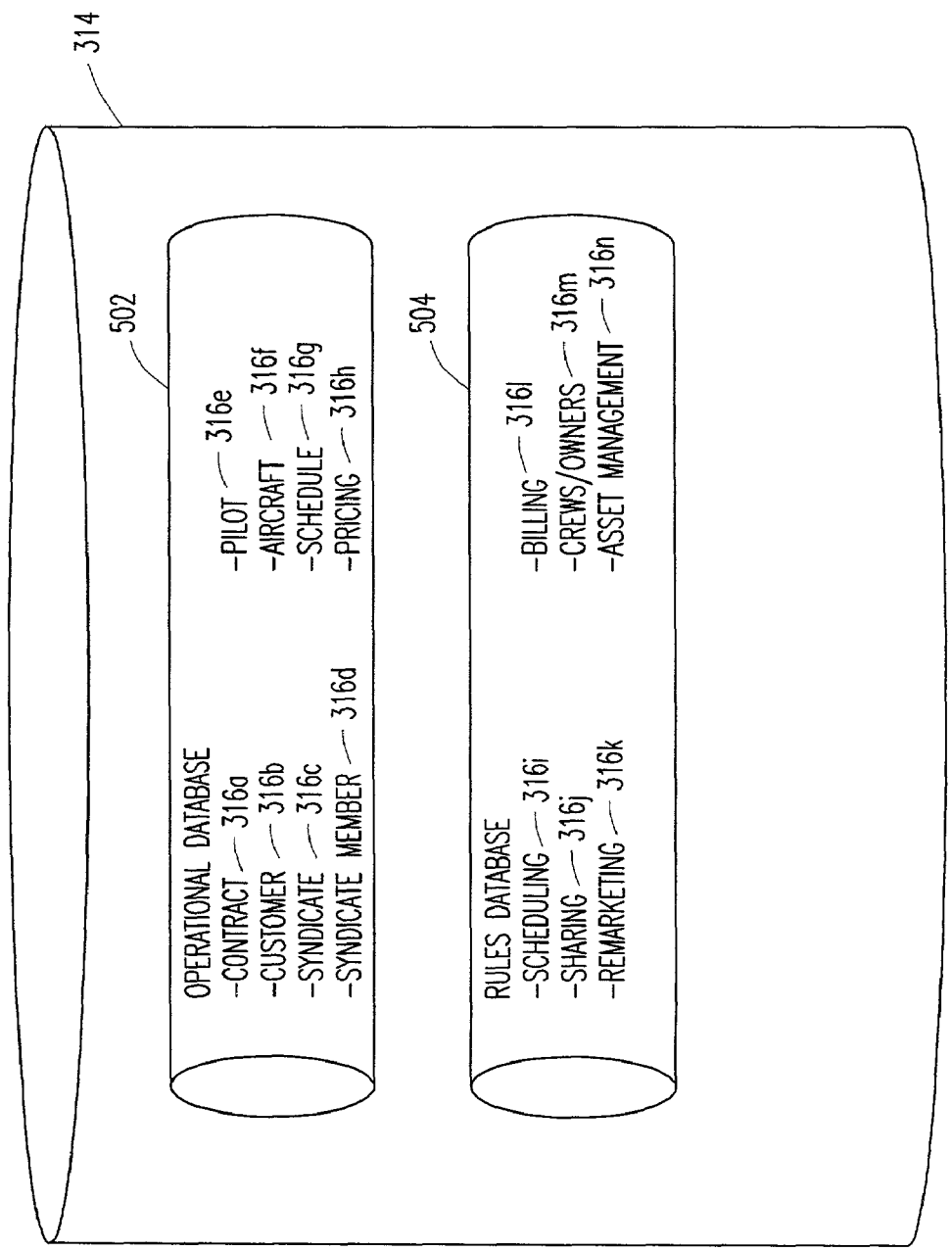
FIG. 5 illustrates a storage unit for the system having exemplary databases stored therein and formed as an operational database and rules database.
Figure 8:
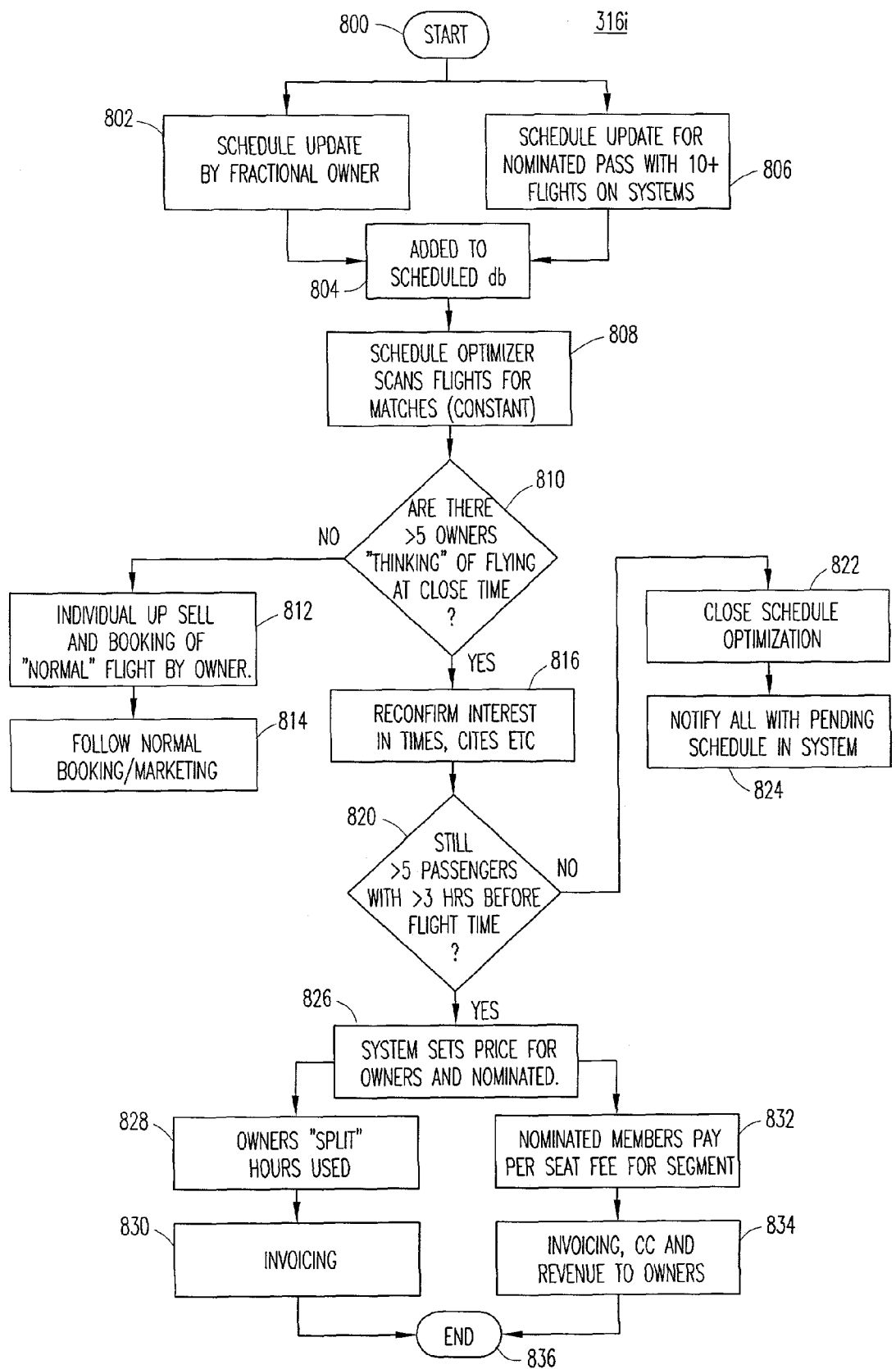
Figure 9:
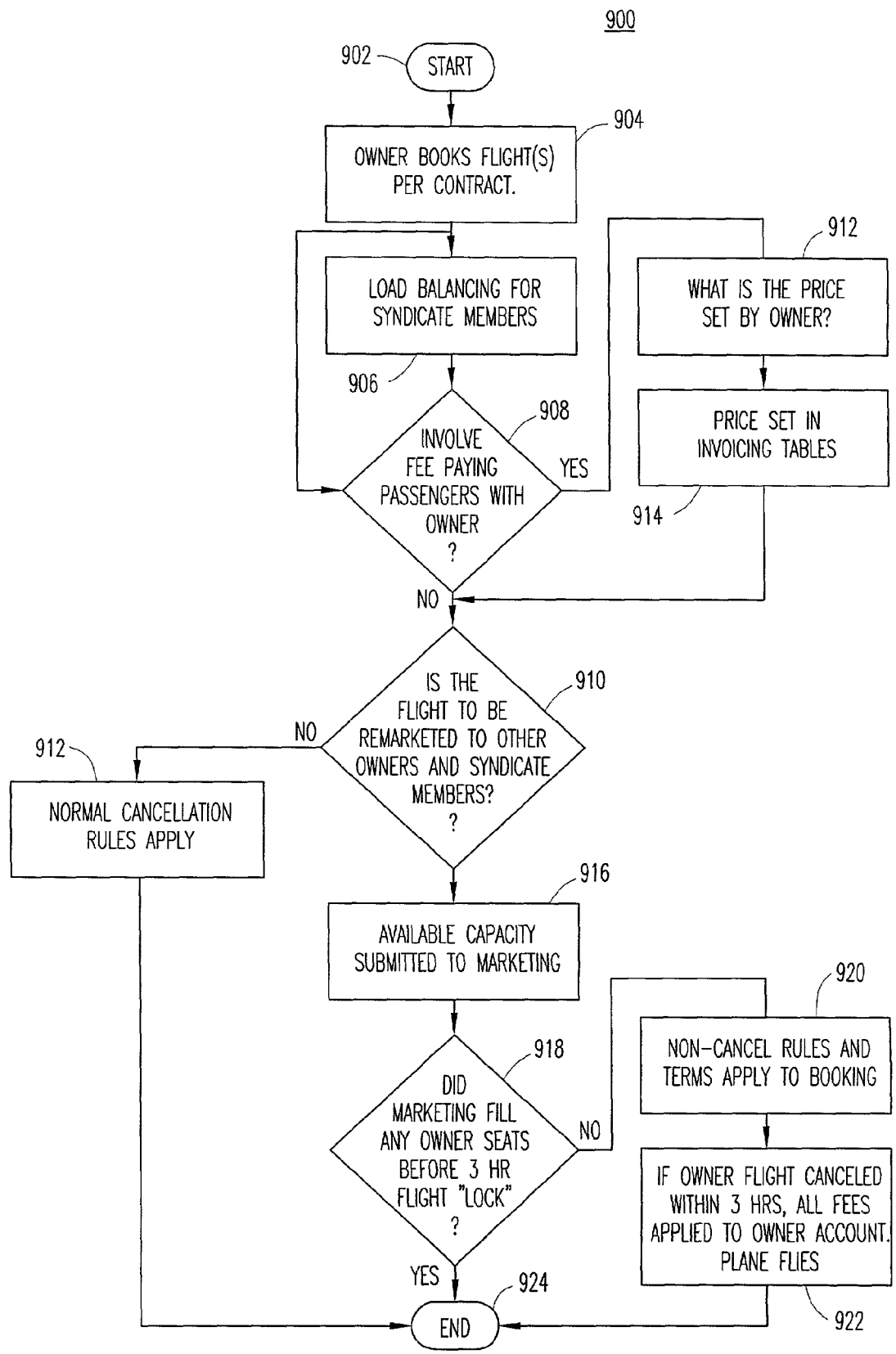
Figure 10:
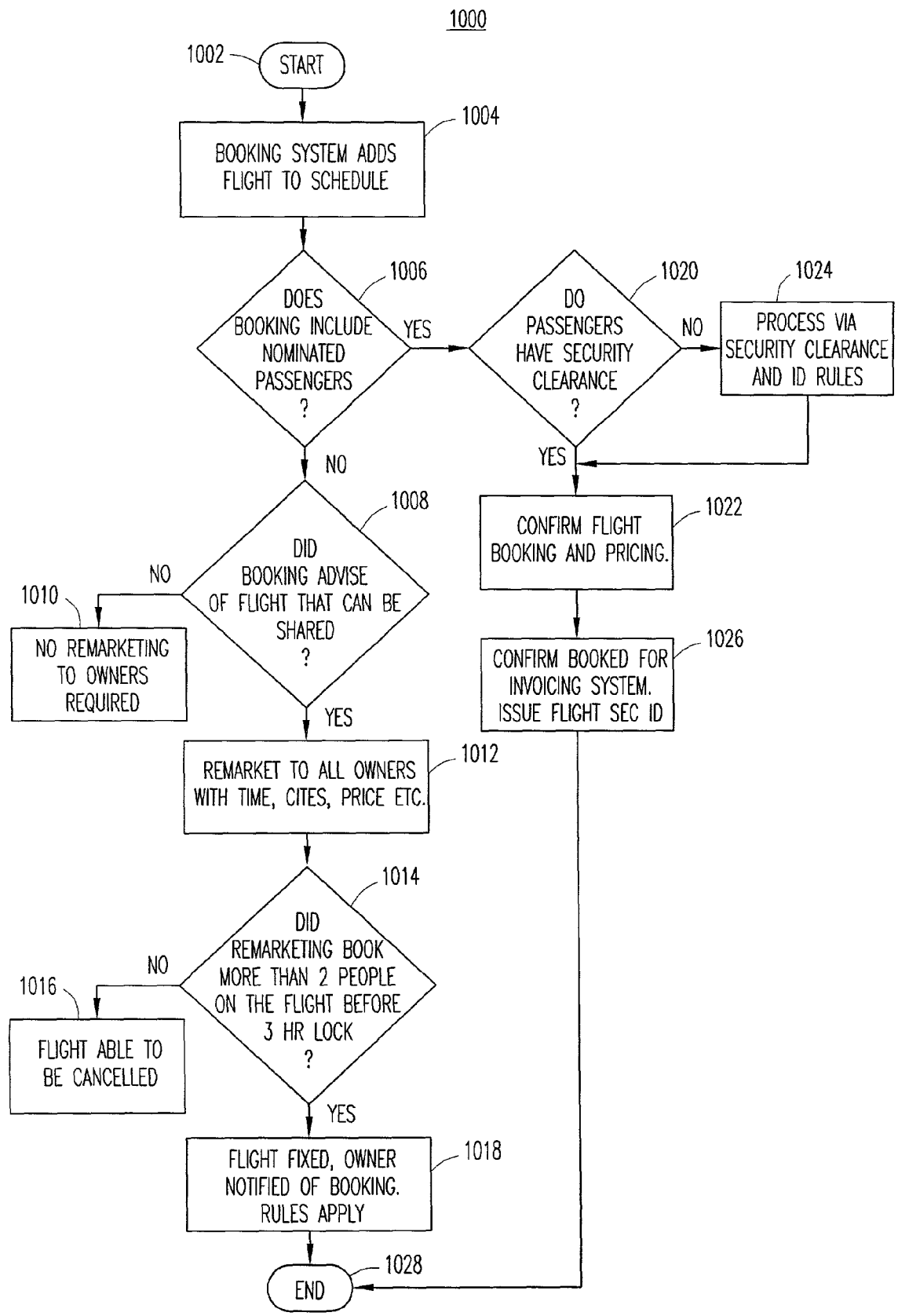
Figure 11:
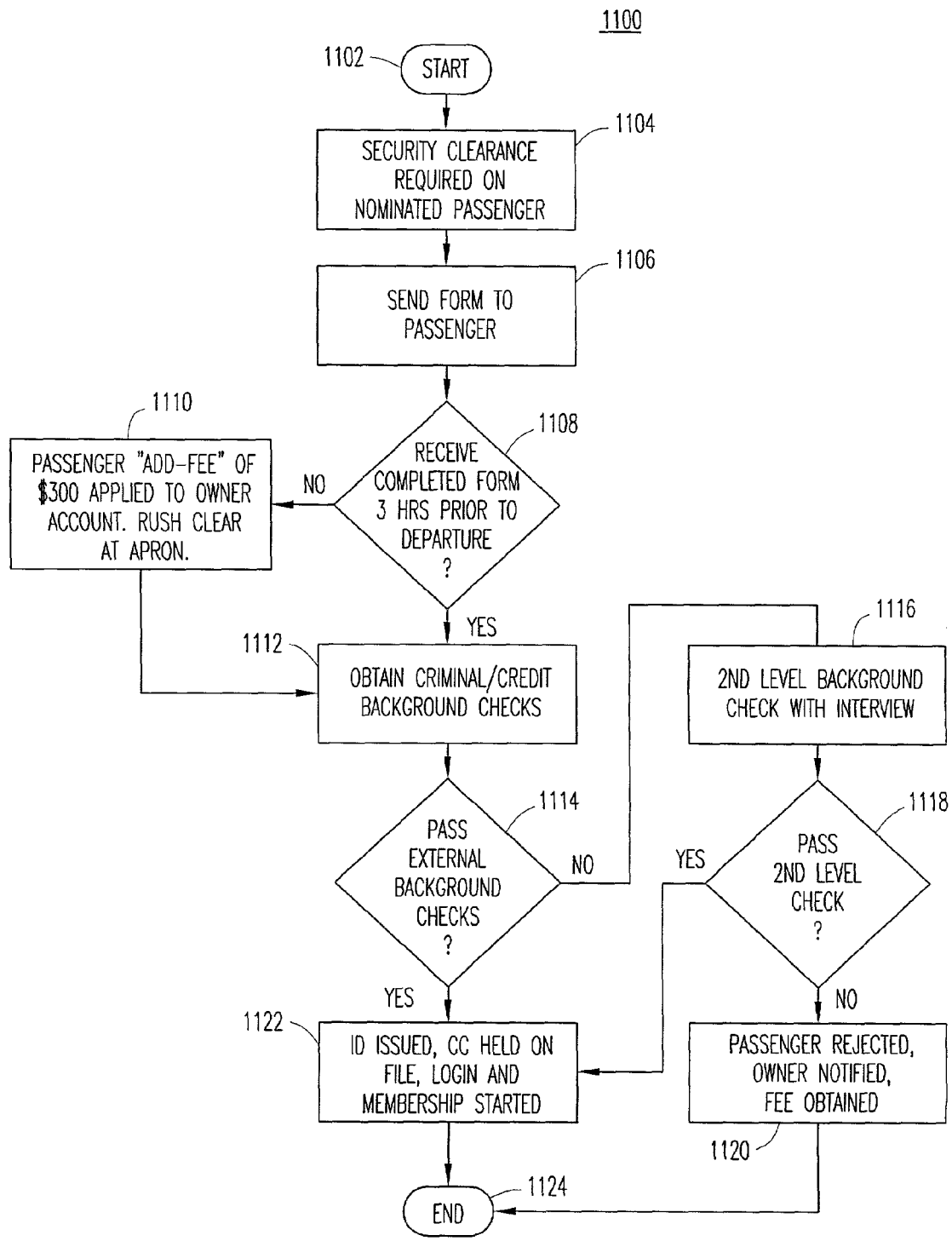
Figure 12:
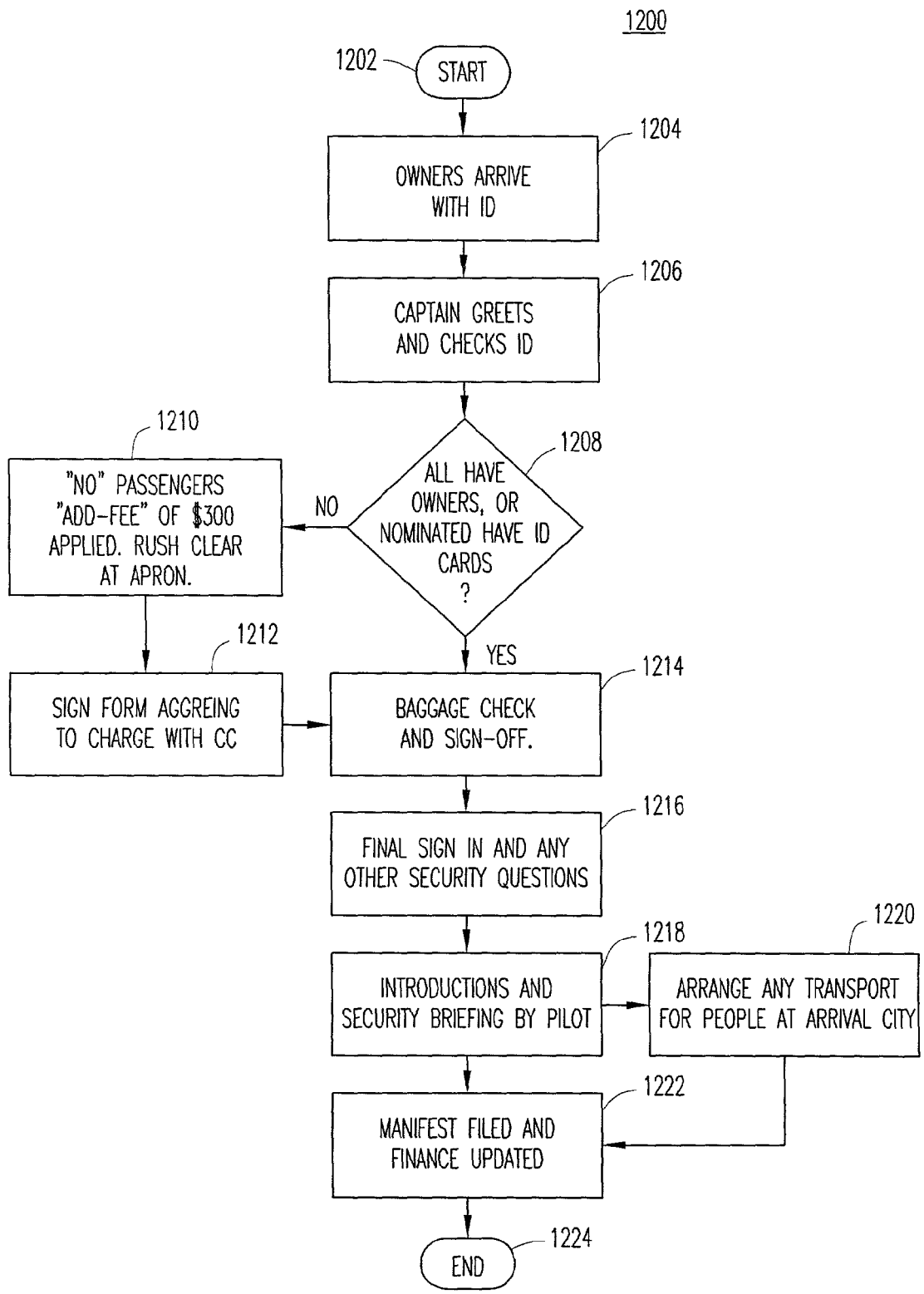
Figure 13:
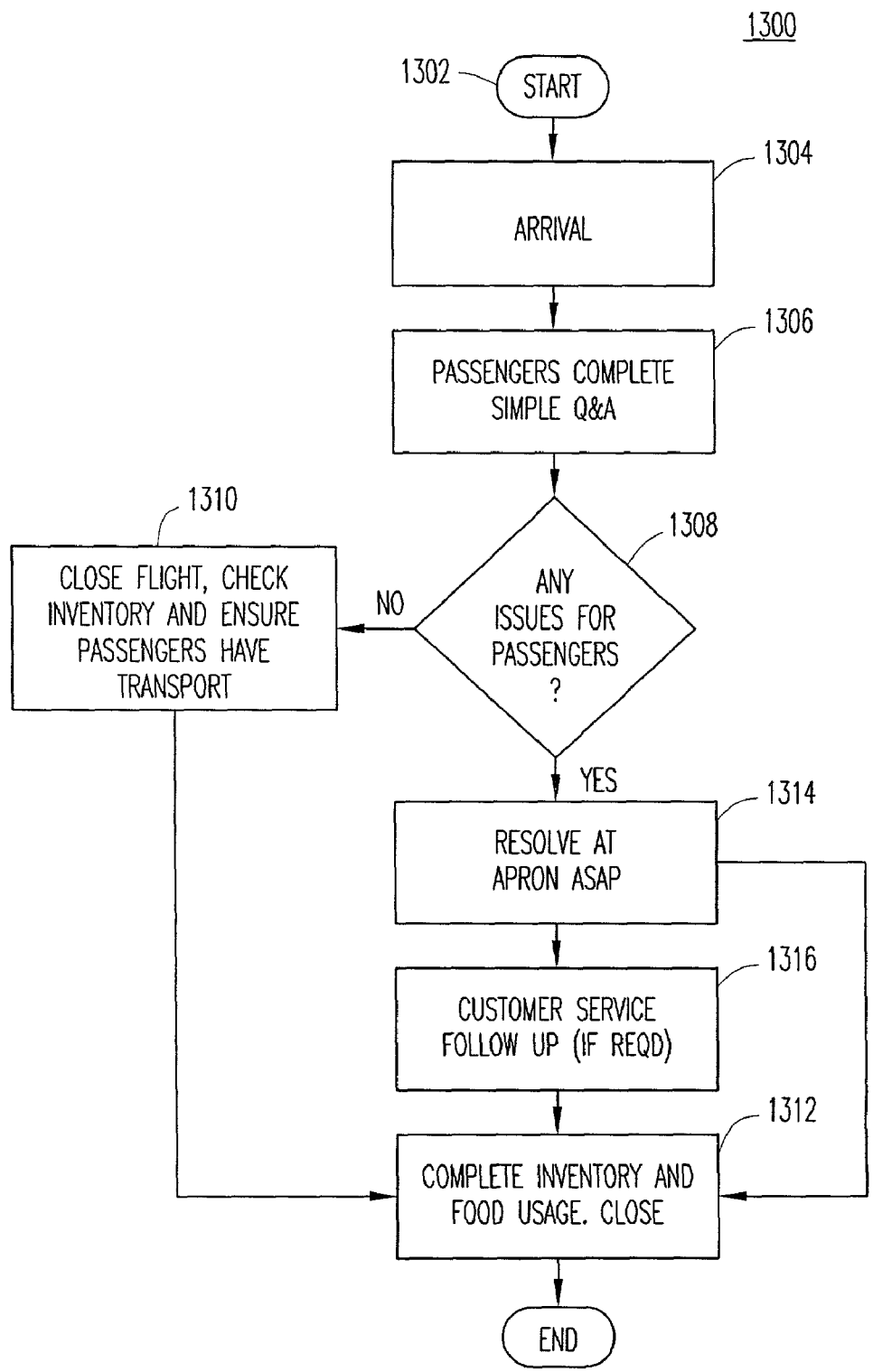
Figure 14:
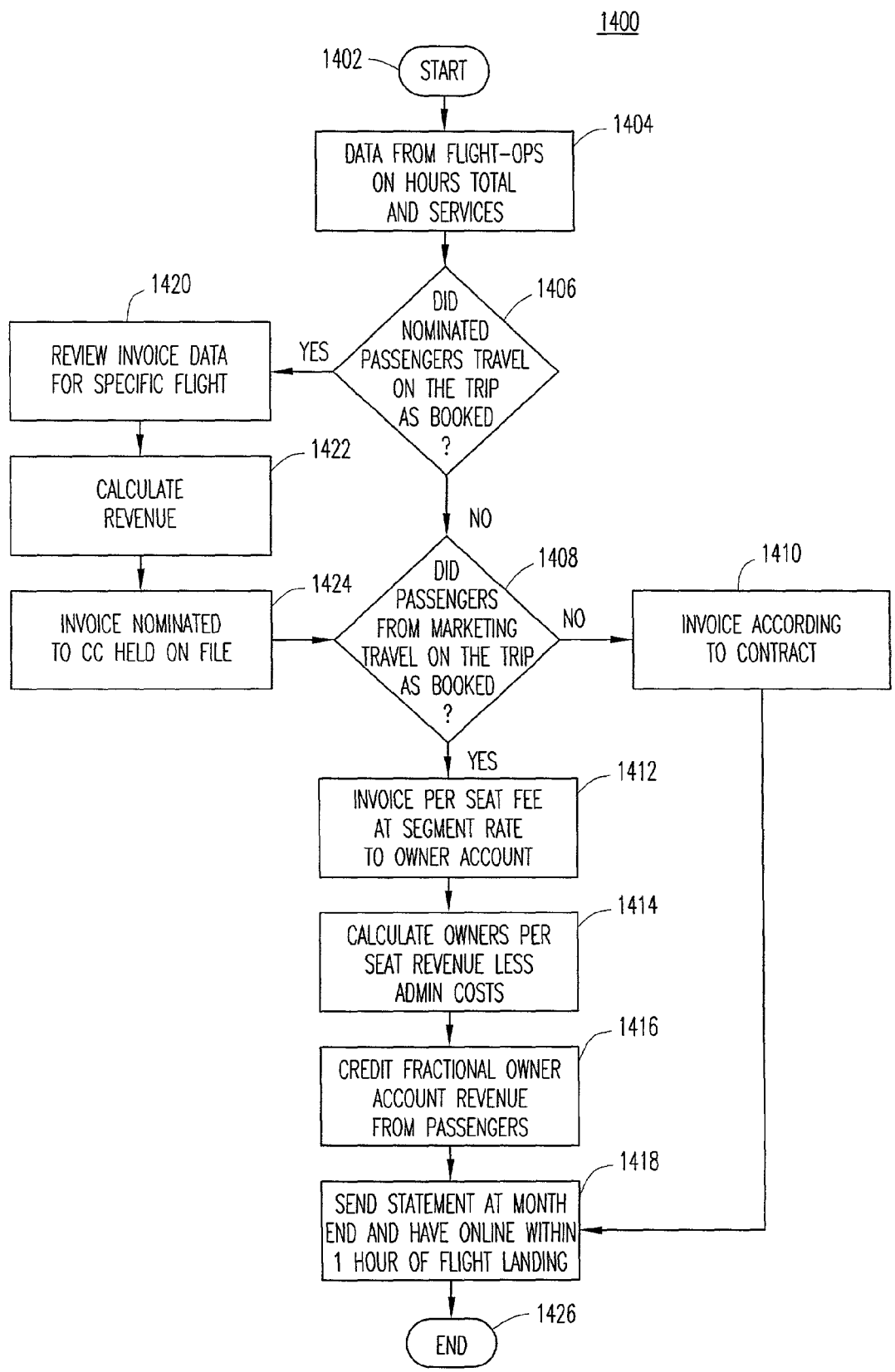
Figure 15:
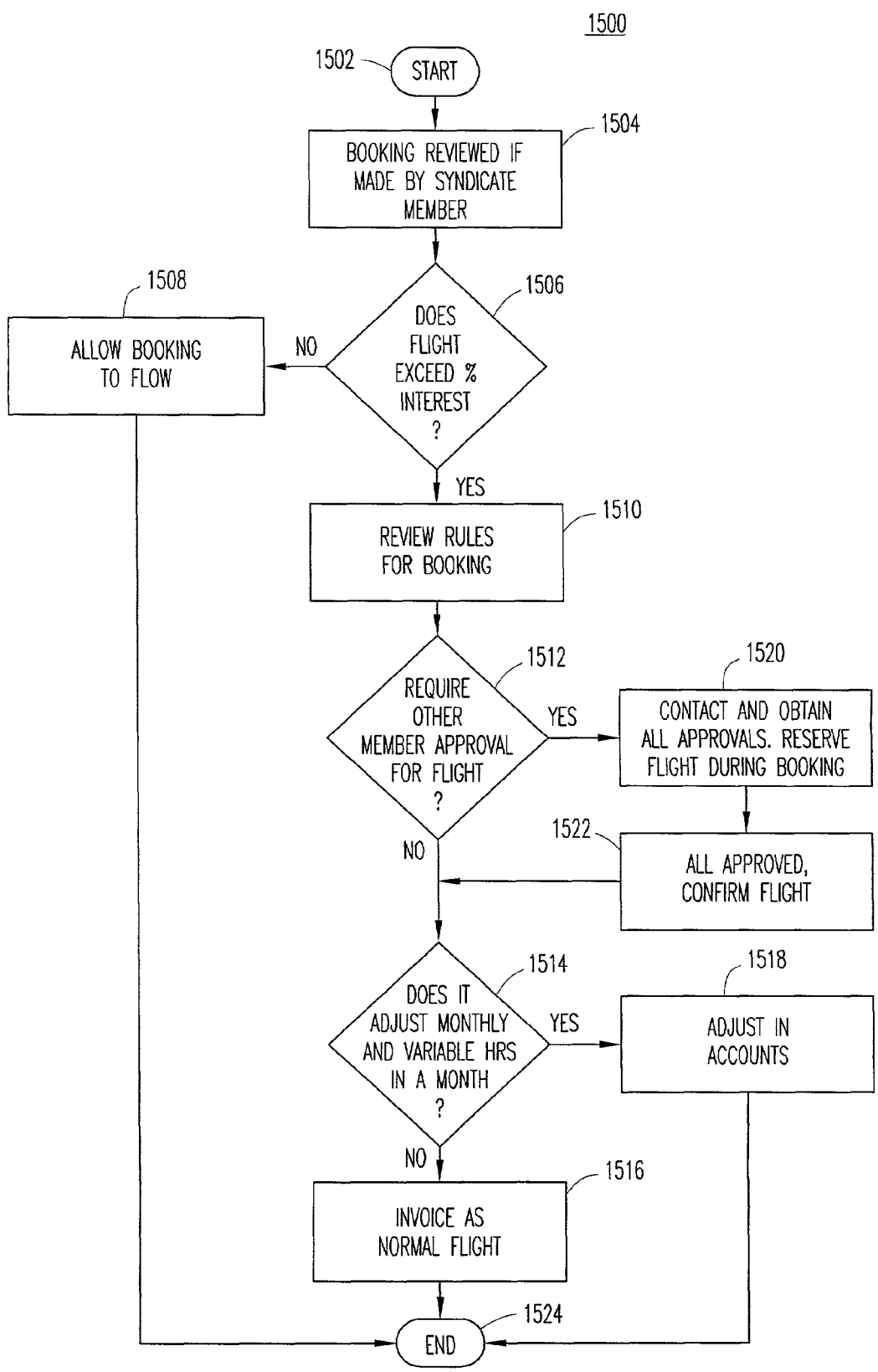
Figure 16:
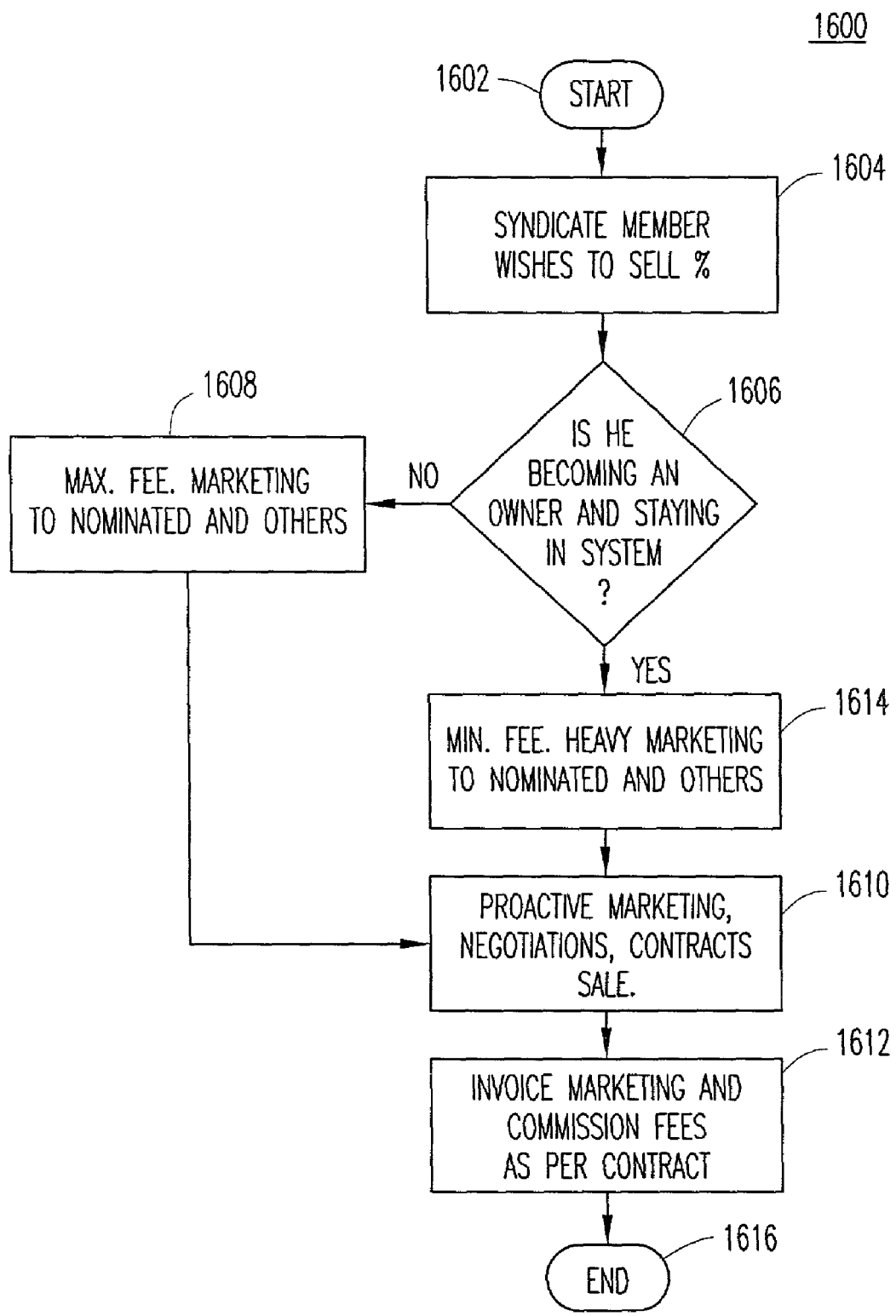

FIGS. 7A and 7B provide an exemplary mobile wireless device operable to communicate electronic messages as provided on the communication infrastructure of FIG. 3;

FIGS. 8-16 are exemplary flow diagrams describing rules as maintained by the databases of FIG. 5 for the fractional operator of FIG. 1 to manage the fractional ownership program according to the principles of the present invention, more specifically, but not by way of limitation:

FIG. 8 is a exemplary flow diagram describing rules for the fractional operator of FIG. 1 to perform scheduling functions for the fractional ownership program;

FIG. 9 is a exemplary flow diagram describing rules for the fractional operator of FIG. 1 to perform booking functions for the fractional ownership program;

FIG. 10 is an exemplary flow diagram for marketing available capacity of the aircraft to fractional owners and syndicate members of the fractional ownership program;

FIG. 11 is an exemplary flow diagram for providing security clearances for the fractional owners, syndicate members, and nominated members of FIG. 1 for the fractional ownership program;

FIG. 12 is an exemplary flow diagram for utilizing the identification card issued upon successfully completing the background check of FIG. 11;

FIG. 13 is an exemplary flow diagram for providing security at landing by the fractional operator of FIG. 1;

FIG. 14 is an exemplary flow diagram for the fractional operator to perform invoicing and financing duties according to the contract of FIG. 1;

FIG. 15 is another exemplary flow diagram providing additional rules for performing invoicing and financing by the fractional operator of FIG. 1; and FIG. 16 is an exemplary flow diagram providing for remarketing an ownership percentage of a syndicate member by the fractional operator of FIG. 1.

DETAILED DESCRIPTION OF THE PRESENTLY PREFERRED EXEMPLARY EMBODIMENTS

Fractional ownership of an aircraft has become a growing industry in response to increased influence lowering costs, increased affluence, airport congestion, and reduction of commercial airline services. Fractional aircraft ownership as understood in the art is defined as partial (direct) ownership of an aircraft by multiple entities. A fractionally owned aircraft is one that is owned by individuals or business entities having a share of ownership of the aircraft. Such an ownership criteria may change according to federal regulations. It is understood in the art that an aircraft owned by a fractional owner is typically placed into a pool of aircraft managed by a fractional operator. And, that while a fractional owner may own a percentage of an aircraft, that usage of an aircraft by the fractional owner from the pool of aircraft is deemed to be usage of the aircraft owned by the fractional owner.

While fractional ownership has been growing, fractional operators seek to further increase fractional aircraft ownership. One reason for fractional ownership being limited in growth is the cost of ownership, where the cost is a function of (i) aircraft purchase price and (ii) monthly fixed and variable costs and expenses. As fractional aircraft operators typically operate under a FAR Part 91 certification, which is issued and regulated by the Federal Aviation Administration (FAA), the fractional aircraft operators are limited in the ability to lower costs for the fractional owners of the aircraft. Traditionally, the fractional operators generate profits by the selling the aircraft at a purchase price having a sufficient margin and reducing operational costs. However, without continued sales to fractional owners, a cost reduction business model is limited.

According to the principles of the present invention, a fractional aircraft operator operates an aircraft under an FAA certification that permits the sale of aircraft capacity, including seats and/or cargo space. One such FAA certification is a FAR Part 135 certification, which is typically utilized by aircraft charter services to perform air taxi services. By operating a fractionally owned aircraft under the FAR Part 135 certification, the fractional aircraft operator is able to transport and bill individuals other than the fractional owners without having to transfer the aircraft on a temporary basis from the control of the fractional operator into the possession and operation of a charter aircraft service as has been done in the past. This transfer may be problematic from a fractional owner's point-of-view because of a once-removed relationship with the charter service, which typically does not focus on safety, security, and management of the aircraft with the fractional owners in mind.

In addition to operating the aircraft under the FAR Part 135, at least one of the fractional owners may be a syndicate formed of multiple members (i.e., syndicate members). The syndicate members may be individuals and/or business entities and have equal or unequal shares of ownership of the aircraft. By having a given fractional owner be a syndicate and the aircraft be operated under a FAR Part 135, the fractional operator is able to bill the fractional owner/syndicate based on usage of the aircraft by the syndicate members (i.e., apportion usage fees amongst the syndicate members for the syndicate). For example, as a typical fractionally owned aircraft is used 800 hours per year, a one-quarter share owner has approximately 200 hours per year or 16.7 hours per month of utilization. A slightly higher charge can buy additional 50 hours per year or 4.3 hours per month for a total of 21 hours per month which provides for three 3 hour leg round-trip flights per month. Therefore, if three entities form a syndicate ownership, then each of the syndicate members may utilize one of the hour leg round-trip flights per month. Each of these flights can be billed or apportioned directly to the syndicate member on behalf of the syndicate operating as a fractional owner.

To further capitalize on the FAR Part 135 certificate, each of the fractional owners and syndicate members may nominate a non-owner (i.e., nominated member) to share a portion of the allotted flight time and have the fractional aircraft operator bill the nominated member directly. The nominated member may pay for the usage on a per seat basis as established by the nominating fractional owner or syndicate member. The per seat basis may be a fixed fee for a location-to-location segment, round-trip, and/or a fee per time duration of travel. Additionally and/or alternatively, other factors may be utilized for setting the per seat basis, such as day of flight, hour of flight, etc. By allowing for the nominated members to be billed directly because of the aircraft operating under a FAR Part 135, the fractional owners and/or syndicate members are provided flexibility in that the available capacity can be "sold" and the allocated capacity fees be provided to the nominating fractional owner or syndicate member. To provide added flexibility for the fractional owners and syndicate members, once a fractional owner or syndicate member has booked a flight with the fractional operator, a notification may be sent to the other fractional owners and syndicate members that a flight is booked and that available capacity may be booked on a per seat basis as set by the booking fractional owner.

Each of the nominated members undergo a background check, including identity, criminal background, nationality, resident status, veracity, and/or credit, for example, so that the fractional owners have an increased sense of safety when sharing the aircraft with other fractional owners, syndicate members, and nominated members.

Because the fractional owners and syndicate members dictate the terms of flight (e.g., when and where the aircraft is to fly), they maintain "command and control" or "operational control" of the aircraft. Command and control as defined by the FARs with respect to a flight means "the exercise of authority over initiating, conducting or terminating a flight." Command and control of the aircraft by the owner allows for certain benefits under the tax code for the fractional owners and syndicate members. The fractional operator may hold an ownership interest in the aircraft that provides command and control authority over the aircraft in the event that command and control is desirable to be provided by the fractional operator.

One embodiment provides for fractional owners and syndicate members to book a flight in advance. The booking fractional owner or syndicate member may specify a passenger sharing option, either exclusive or shared aircraft usage. During the time between booking and take-off, the air travel marketing service may notify other fractional owners and syndicate members of the flight plan if the booking fractional operator or syndicate member indicates a shared usage option.

FIG. 1 is an exemplary block diagram 100 for providing and managing a fractional aircraft ownership program in accordance to the principles of the present invention. A fractional operator 102 operates an aircraft 104 under a certification 106 that permits sale of aircraft capacity under a Federal Aircraft Aviation (FAA) certification. In one embodiment, the certification 106 may be a FAR Part 135 as specified by the FAA. However, as regulations tend to change over time, the certification 106 may include other FAR Part certifications that permit the sale of aircraft capacity.

To further distinguish fractional and commercial operators, the following is offered. Unlike "commercial" aviation aircraft operated by carriers operating under commercial carrier regulations as specified by the FAA, aircraft used in business and corporate aircraft services typically do not carry greater than nineteen passengers. Additionally, business and corporate aircraft typically are not mandated by the FAA to operate the aircraft with flight attendants and a variety of safety and medical equipment (e.g., defibrillators), which are not required typically on corporate and business aircraft provided by the fractional operators and charter services. A scheduled flight typically is initiated, set, and published by the commercial carrier (as opposed to the fractional owner) for potential passengers to book flights. Scheduled flights also may act as a distinguishing feature of a commercial airline. One distinction between a commercial airline and fractional ownership is the notion of command and control. The commercial airline maintains command and control because the terms of the flights are dictated by the airline, while the fractional owners maintain command and control by dictating the terms of flight (e.g., when and where the aircraft flies).

The fractional operator 102 may sell ownership rights to the aircraft 104 to fractional owners 108a-108d (collectively 108). According to the principles of the present invention, at least one of the fractional owners 108 may be a syndicate (i.e., an association of people or firms authorized to benefit from at least a portion of the aircraft 104) formed of multiple individuals and/or business entities 110a-110n (collectively 110), herein identified as syndicate members.

The fractional operator 102 may form a business relationship with the fractional owners 108 via a contract 112. In one embodiment, the contract 112 may include terms that specify a duration of time for the fractional owners 108 to maintain a business relationship with the fractional operator 102. Typical duration terms of the contract may be for a period of five years or more, however, other contractual relationship terms may be utilized in the contract 112, such as one month. As fractional owners 108 purchase and utilize the aircraft 104, ownership fees 114 are paid to the fractional operator 102. The ownership fees 114 may include an initial purchase price of the aircraft 104, fixed monthly fees, and variable monthly fees, described further hereinafter. In the case of the fractional owner 108 being a syndicate 108a, the fractional owner/syndicate 108a is responsible for the payment of fees, less any revenue as described herein, to the fractional operator 102. In return, the fractional operator 102 may issue an identification card 116 that identifies each of the fractional owners 108 and/or syndicate members 110. The identification card 116 may be utilized to verify that the fractional owners 108 and syndicate members 110 are indeed authorized to utilize the aircraft 104 and be verified by a pilot or other employee of the fractional operator.

Each of the fractional owners 108 and syndicate members 110 may "nominate" individuals 118a-118d (collectively 118 and hereinafter "nominated members"). The nominated members 118 receive background checks and, upon successful completion, may receive an identification card 116 issued by the fractional operator 102. The nominated member 118 may share usage time of the aircraft 104 with the nominating fractional owner 108 or syndicate member 110 and be billed on a per seat basis as specified by the fractional owner 108. For example, a business owner who is a fractional owner 108 may nominate a business associate. The business associate, now a nominated member 118, may fly with the fractional owner 108 on business trips and the fractional owner 108 may benefit financially by collecting revenue for the "sold" seat occupied by the nominated member in the amount specified by the fractional owner 108 and collected by the fractional operator 102. Accordingly, the nominated members 118 are billed automatically by the fractional operator 102 on behalf of the fractional owners 108. Both the fractional owner 108 and nominated member 118 benefit from the booking and management services of the fractional operator 102.

In accordance with the FAA regulations for operating under the certificate 106, a allocated capacity fee based on usage may be collected from the fractional owner 108 and/or syndicate member 110 by the fractional operator 102. In that regard, the syndicate members 110 may be billed according to usage of the aircraft 104 on behalf of the fractional owner 108a by the fractional operator 102. In other words, as syndicate members 110 utilize the aircraft 104, an accounting may be performed by the fractional operator 102 to charge allocated capacity fees, typically billed as dollars per hour, to the syndicate members 110 and maintain an accounting on time used against a total usage time allotted to the fractional owner 108.

Because the fractional operator 102 is operating under the certificate 106, the nominated members 118 are charged a fee on a per seat basis as established by the fractional owners 108. In the case of the fractional owner 108 being a syndicate 108a, the syndicate 108a may determine a fee structure for the nominated members 118. For example, the syndicate members 110 may determine a fee price on a per seat basis for nominated members 118 based on a desire to reduce ownership fees 114 owed to the fractional operator 102 for ownership and/or usage of the aircraft 104. More specifically, the fractional owner 108d may elect to charge the nominated member 118d $400 per seat per flight while the fractional owner/syndicate 108a may elect to charge nominated members 118a-118c a allocated capacity fee of $250 per seat and per flight. It should be understood that the fractional owners 108 may utilize the ability to charge the allocated capacity fees to the nominated members 118 to offset or eliminate usage fees for the aircraft 104. And, because the fractional operator 102 operates the aircraft 104 under the certificate 106 that allows for the sale of aircraft capacity, the fractional operator 102 may collect the allocated capacity fees from the nominated members 118 and apply those collections to the appropriate fractional owner 108. The terms and conditions of servicing nominated members may be provided in the contract 112.

In accordance with the principles of the present invention, the fractional operator 102 may provide sharing options for the fractional owners 108 and/or syndicate members 110. The sharing options include exclusive and shared aircraft usage. The exclusive aircraft usage indicates that the fractional owner 108 or syndicate member 110 does not want to share the aircraft 104 with other fractional owners 108 or syndicate members 110 through a capacity marketing service provided by the fractional operator 102. The aircraft usage sharing option provides that the fractional owner or syndicate member is open to allowing other fractional owners 108 or syndicate members 110 to share the aircraft 104 during flight. Of course, to provide reasonable safety assurances to the fractional owners 108 and syndicate members 110, the identification cards 116 should be presented to an employee of the fractional operator 102 prior to boarding the aircraft 104. In the case of fractional owners 108c and 108d sharing the aircraft 104, the booking fractional owner 108c uses flight time while the other fractional owner 108d may use flight time or pay on a per seat basis in accordance with the terms set by the booking fractional owner 108c.

The fractional operator 102 may provide booking and management services for the fractional owners 108 and syndicate members 110 on behalf of the fractional owner/syndicate 108a. The management services provided by the fractional operator 102 on behalf of the fractional owner/syndicate 108a may include billing and accounting for the syndicate members 110 on behalf of the fractional owner/syndicate 108. In other words, the fractional owner/syndicate 108a, which may operate as a partnership or other business entity, may establish rules and fees for the syndicate members 110 of the syndicate 108a and have the fractional operator 102 or other entity, such as an air travel service manager (not shown), manage the accounts of the fractional owner/syndicate 108a and/or fractional owner 108b-108d.

The booking services that the fractional operator 102 provides, as established by the contract 112, may allow the fractional owners 108 and syndicate members 110 to book a flight for the aircraft 104 with the fractional operator 102 within a pre-established booking window. The booking window may be eight hours or less based on pre-established terms within the contract 112. The fractional operator 102 is thereby obligated to provide the booking fractional owner 108 or syndicate member 110 with an aircraft 104 within the pre-established booking time as contracted. However, if the fractional owner 108, for example, has a booking window of four hours, the fractional operator 102 may charge the fractional owner 108 a higher allocated capacity fee than a fractional owner 108 who has a booking window of eight hours.

According to the principles of the present invention, once the fractional operator 102 receives a request by a booking fractional owner 108 or syndicate member 110 the fractional operator 102 may resell available capacity of the aircraft 104 based on the sharing option selected by the booking fractional owner 108 or syndicate member 110. So, for example, if a fractional owner 108c requests usage of the aircraft 104 and has an eight hour usage window with a shared aircraft sharing option, then the fractional operator 102 may attempt to resell available capacity of the aircraft 104 to other fractional owners 108a-108b and 108d and syndicate members 110a-110n. The fractional operator 102 may perform this reselling of available capacity of the aircraft 104 by calling or contacting the fractional owners 108 and syndicate members 110 via a telephone or other electronic communication system. By performing the selling of available capacity of the aircraft 104, the aircraft 104 may be more fully utilized such that the fractional owners 108 and fractional operator 102 benefit in the higher utilization.

Figure 2:
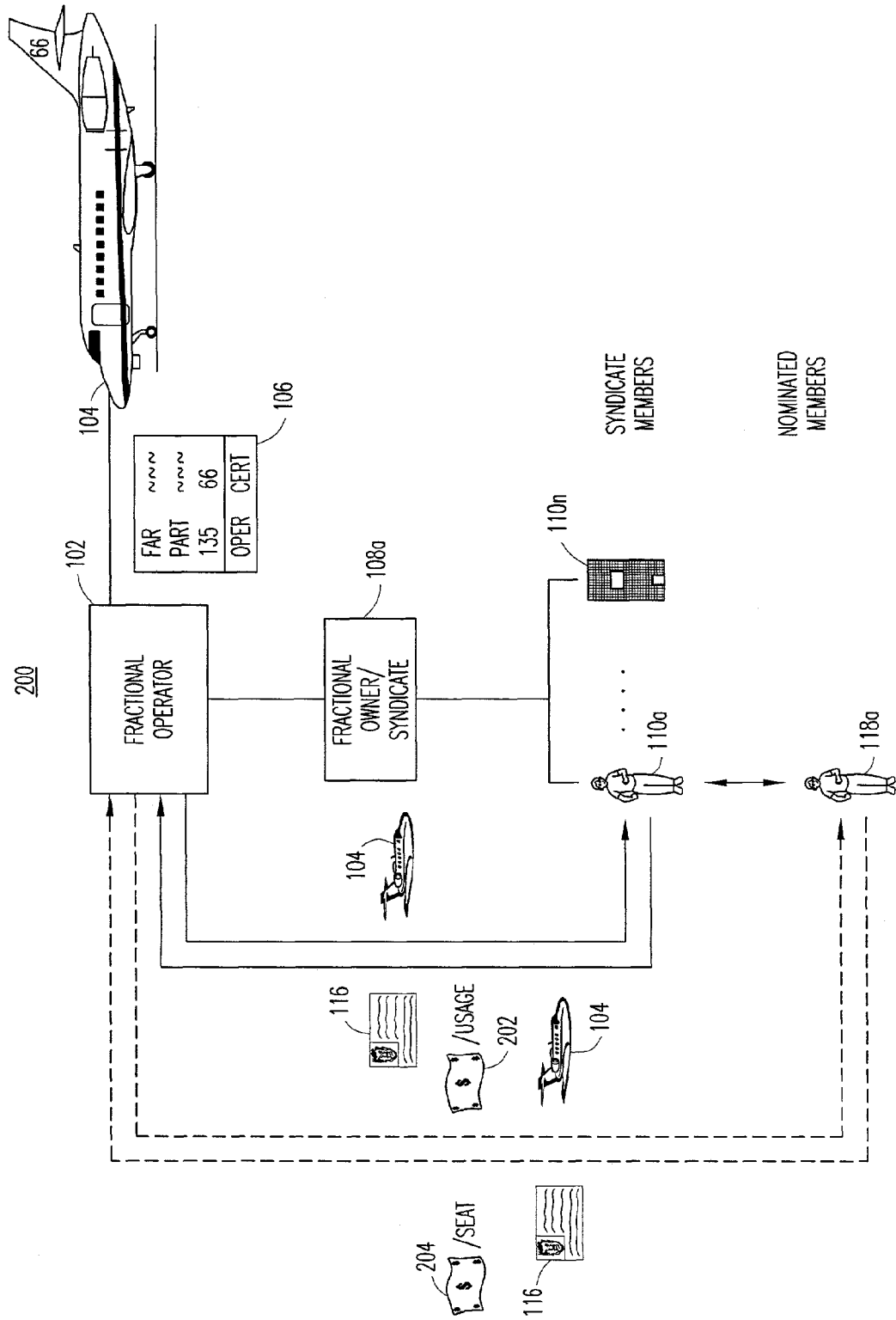
FIG. 2 is an exemplary block diagram of the system illustrating management of the fractionally owned aircraft by the fractional operator of FIG. 1.

FIG. 2 is an exemplary block diagram 200 illustrating management of the fractionally owned aircraft 104 by the fractional operator 102. Upon a syndicate member 110a of the fractional owner/syndicate 108a requesting a flight from the fractional operator 102, the fractional operator 102 provides the aircraft 104 for the syndicate member 110a. To board the aircraft 104, the syndicate member 110a may provide the identification card 116. Alternatively, the syndicate member 110a may provide a government issued identification card, such as a driver's license, to board the aircraft 104. Usage fees 202 are charged to the syndicate members 110 and apportioned to the syndicate members 110 on behalf of the fractional owner/syndicate 108a by the fractional operator 102, accordingly. The allocated capacity fees 202 may be based on an hourly fee set by the fractional operator 102 or, alternatively, by another fractional owner 108 or syndicate member 110 originating the booking of the aircraft 104. In addition, the fractional owner/syndicate 108a need not perform billing operations itself as the fractional operator 102 may provide a service to bill the syndicate members 110 who utilize the aircraft 104 more than other syndicate members 110. The syndicate members 110 may be billed proportionately with their usage and in accordance with any guidelines established by the fractional owner/syndicate 108.

In the case of a nominated member 118a utilizing the aircraft 104 with the syndicate member 110a, the fractional operator 102 may bill the nominated member 118 according to the terms of the contract 112 and established by the fractional operator 102 and fractional owners 108. In billing the nominated member 118a, the fractional operator 102 may bill on a per seat basis as specified by the fractional owner/syndicate 108a. In other words, the fractional owner/syndicate 104a may specify the cost on a per seat basis for nominated members of the syndicate members 110 and the fractional operator 102 may collect revenue generated from the nominated members 118 on behalf of the fractional owner 108 or syndicate 108a. The syndicate members 110 may determine how to apportion the revenue generated from nominated members 118 independent from the fractional operator 102. Alternatively, the fractional owner/syndicate 108a may specify to the fractional operator 102 to automatically apportion allocated capacity fees 204 collected from the nominated members 118 to the account of the syndicate members who shared flight time with the nominated members 118. As an incentive to nominated members 118 to utilize the flight service, the fractional operator 102 may allow the nominated members 118 to provide the fractional operator 102 with a schedule and the fractional operator 102 may notify the nominated member 118 of bookings by the nominating fractional owner 108 or syndicate member 110. To board the aircraft 104, the nominated member 118a provides the identification card 116 to an employee, such as the pilot, of the fractional operator 102.

FIG. 3 is an exemplary system block diagram 300 that illustrates a communication infrastructure for providing management of the fractional aircraft ownership program according to FIG. 1. As shown, the fractional operator 102 may utilize a fractional operator server 302 to maintain and manage information related to the fractional owners via a network 304, such as the Internet and/or public switch telephone network (PSTN). The fractional operator server 302 includes a processor 306 operable to execute software 308, such as software that may be utilized to maintain a database or perform flight scheduling operations, for example. The processor is coupled to a memory 310, input/output (I/O) unit 312, and storage unit 314. The storage unit 314 may store databases 316a-316n. The databases may be utilized to maintain information associated with the fractional owners 108, syndicate members 110, operation of the aircraft 104, and other related information for the fractional operator 102. To manage the databases 316, an employee of the fractional operator 102 may utilize a computing system 318 coupled to the fractional operator server 302. It should be understood that the fractional operator server 302 may be a server or other computing system managed and operated by an associated or independent business entity for providing management services of the fractional operator 102.

The fractional operator 102 may utilize the fractional operator server 302 to communicate data with the fractional owners 108, syndicate members 110, and nominated members 118 regarding booking and flight services via the network 304 utilizing data packets 320a-320b (collectively 320). As shown, the fractional operator 102 may communicate with the fractional owner 108b via a conventional telephone 306a over the network 304. The fractional operator 302 may communicate with the fractional owner 108c via the network 304 by way of an electronic message, such as an e-mail, to be received by the fractional owner 108c utilizing a personal computer 306b. The syndicate member 110a may communicate with the fractional operator server 302 utilizing a portable computer 306c via the network 304. The syndicate member 110b may communicate via a mobile wireless device 306d, such as a mobile phone, via a wireless network 322 coupled to the network 304 and an antenna 324. As understood in the art, the data packets 320 may be utilized to communicate the data from the mobile wireless device 306d and the fractional operator server 302. Similarly, the nominated member 118a may utilize a mobile wireless device 308a, such as a personal digital assistant (PDA), having wireless capability and communicate via the wireless network 322. The nominated member 118b may utilize a wireless device 308b operable to communicate with the fractional operator server 302 via a satellite communications network 326. As understood in the art, the satellite communications network 326 is coupled to a satellite dish 328 that communicates via a satellite 330 with the wireless device 308b. It should be understood that the principles of the present invention are not limited to any form of communication, electronic or otherwise, with the fractional owners 108, syndicate members 110, and nominated members 118.

Figure 4:
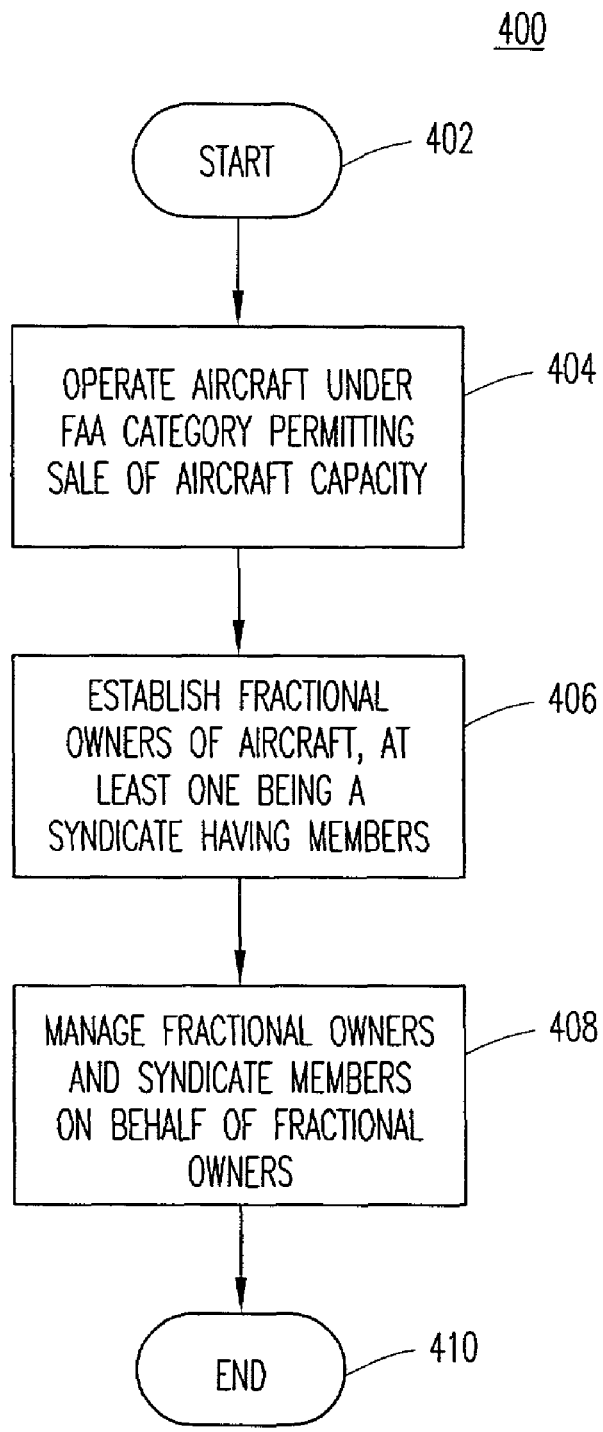
FIG. 4 is an exemplary process provided in a flow diagram to establish and manage the fractional ownership program provided in FIG. 1.

In establishing and operating the fractional aircraft services, the fractional operator 102 may utilize the exemplary process provided in flow diagram 400 of FIG. 4 to establish and manage the fractional ownership program provide in FIG. 1. The process starts at step 402. At step 404, the fractional operator may operate the aircraft 104 under an FAA certification permitting sale of aircraft capacity (i.e., seat and cargo space). At step 406, the fractional operator 102 may establish fractional owners 108 of the aircraft 104, where at least one of the fractional owners is a syndicate that has members associated therewith. In terms of selling aircraft capacity, if the aircraft 104 is to be flown between two cities having only a single fractional owner 108 utilizing the aircraft 104, then the available aircraft capacity may be resold by the fractional operator 102 to other fractional owners 108 and syndicate members because of the FAA certification under which the aircraft is operating (e.g., FAR Part 135). The fractional owners 108 may also resell the available capacity to the nominated members 118. The fractional owners 108 and syndicate members 110 maintain command and control by controlling terms of flights. By maintaining command and control, the fractional owners 108 are able to gain benefits under the United States tax laws in terms of depreciation, for example. At step 408, the fractional operator 102 manages the fractional owners and syndicate members on behalf of the fractional owners 108. In managing the fractional owners 108 and syndicate members 110, the fractional operator 102 may utilize the fractional operator server 302 for booking, managing, and scheduling purposes, for example. The process ends at step 410.

FIG. 5 illustrates the storage unit 314 having exemplary databases 316a-316n stored therein and formed as an operational database 502 and rules database 504. As indicated, the operational database 502 includes eight databases 316a-316h and the rules database 504 have been itemized as six database components 316i-316n. Other classifications based on business needs could also be included in the same or other databases. The operational database 502 is composed of data utilized to operate and manage the fractional aircraft ownership program according to the principles of the present invention for the fractional operator 102. It should be understood, however, that the information identified as part of the operational and rule databases 502 and 504 may be more or less inclusive and have an arrangement different from that provided herein, but still provide for the substantially same functionality. The rules database 504 include rules for the fractional operator 102 to manage the assets, including personnel, equipment, and customers (i.e., fractional owners 108 and syndicate members 110). Rules for servicing the nominated members 118 may also be included in the rules database 504. Additionally and/or alternatively, the rules may be "hard-coded" in the form of software and retrieve parameters, if necessary, from the rules database 504.

TABLES 1-9 represent exemplary databases 316a-316h of the operational database 502 utilized by the fractional operator 102 or other associated business to maintain and manage the information in providing the fractional ownership program according to the principles of the present invention. As understood in the art, the databases 316a-316h are relational in that information stored in one database is related to information stored in other database(s). For example, TABLE 1 is an exemplary contract database having data related to the contract 112 between the fractional owners 108 and fractional operator 102. At least one of the data elements in TABLE 1, such as ContractID, is included in another database, such as TABLE 2 (customer database 316b). By maintaining such a relationship of the data, the information stored in the databases 316 may be correlated to enable the functionality that the fractional operator 102 provides by the fractional ownership program.

More specifically, TABLE 1 is an exemplary database 316a that maintains exemplary contract information between the fractional operator 102 and fractional owners 108. The information includes both ownership information (e.g., ContractID, ownership share, and AircraftID) and financial information (e.g., Monthly Rate, Hourly Variable Rate, and depreciation tax rate (i.e., Depr_Tax_Rate)). Other operational terms, such as booking terms (i.e., Hrly_Commit_Booking), may also be maintained. By maintaining the contract terms, the fractional operator 102 may easily provide usage and billing services for the fractional owners 108.

TABLE 1

Contract Database

| Data Elements | Data | | | |
|---|---|---|---|---|
| ContractID | C324 | C329 | C510 | C634 |
| Share | 0.25 | 0.25 | 0.25 | 0.5 |
| Monthly Rate | $22,000 | $21,900 | $19,000 | $24,000 |
| Hourly Variable Rate | $1,700 | $1,690 | $1,499 | $1,890 |
| Uplift_rate | $2,200 | $2,200 | $2,200 | $3,000 |
| Pilot_Pref_ID | P001 | P001 | P003 | P099 |
| Pilot_Sec_ID | P002 | P001 | P089 | P001 |
| Hrly_Commit_Booking | 6 | 6 | 8 | 4 |
| Hours_per_year | 250 | 250 | 250 | 500 |
| Depr_Tax_Rate | 7 | 7 | 7 | 12 |
| AircraftID | SJS7665 | SJS5353 | SJS5353 | SJS0867 |

TABLE 2 is an exemplary database 316b that maintains exemplary customer information related to the fractional owners 108. The information maintained by the database of TABLE 2 includes identification information (e.g., CustID, Cust_Name, level of ownership (e.g., Ind_or_Synd), and ContractID). Contact information, including telephone number, email address, and contact device type (i.e., Cust_Primary_Device_Type), may also be provided in the customer database. Finally, sharing preferences of the fractional owners 108 and syndicate members 110 may be maintained to allow the fractional operator 102 to determine whether other passengers within the fractional owner 108 and syndicate members 110 groups may simultaneously utilize the booked aircraft. Other information, such as tax related identifiers, may be included to allow the fractional operator 102 to determine how most appropriately provide the services for the fractional owners 108 based on tax implications and financial considerations. It should be understood that the customer database may include other preference information, including a desire/requirement to not fly with family or friends, such as children or young adults, of another fractional owner 108 or syndicate member 110.

TABLE 2

Customer Database

| Data Elements | Data | | |
|---|---|---|---|
| CustID | 4144 | 1222 | 9299 |
| Cust_Name | Gary Smith | Toby Wilson | Group One |
| Ind_or_Synd | Ind | Ind | Syn |
| ContractID | C324, C634 | C329 | C634 |
| Share | 0.25 | 0.25 | 0.25 |
| Syndicate_Group | — | — | 87387 |
| Cust_Tel_no | 650-555-1212 | 214-555-1212 | 214-555-1213 |
| Cust_Email_Add | gary@comp.com | toby@gs.com | groupone@corporateclipper.com |
| Website_Login | gary@mycorporateclipper.net | twilson@mycorporateclipper.net | — |
| Allow_Shared_Flight | Y | Y | — |
| Allow_Nom_Shared_Flight | Y | Y | — |
| Cust_Home_Loc | Sunnyvale | Dallas | Mixed |
| Cust_Primary_Device_Type | Desktop PC | WAP Phone | — |
| Shared_Preference | Shared | Exclusive | Shared |
| Cust_Tax_Flag | High | Sensitive | Mixed |
| Admin_Delegate | Mary | — | Susan |
| Admin_email | mary@comp.com | — | susan@groupone.com |
| Sync_Outlook_Sched | Y | Y | Y |

TABLE 3 is an exemplary database 316c that maintains information related to the fractional owners/syndicates 108. As provided, the syndicate database 316c includes contact information (e.g., telephone number, location, invoicing address, administration delegate, etc.), sharing profile information, and tax identifiers. Because the fractional owners/syndicates 108 may have different concerns, including from a tax standpoint, than an individual fractional owner 108, the information maintained in the syndicate database of TABLE 3 may be focused on different considerations than that of the customer database of TABLE 2. Also, information regarding price per seat sold by the syndicate members 110 for the benefit of the syndicate 108a may be included.

TABLE 3

Syndicate Database

| Data Elements | Data | |
|---|---|---|
| SyndicateID | 87387 | 89001 |
| Syndicate_Name | Group One | O'Farrell LLC |
| ContractID | C634 | C329 |
| Cust_Tel_No | 650-555-1212 | 214-252-2999 |

TABLE 3-continued

Syndicate Database

| Data Elements | Data | |
|---|---|---|
| Cust_Home_Loc | Sunnyvale | Dallas |
| Cust_Tax_Flag | TX1 | TX1 |
| Admin_Delegate | Mary | — |
| Admin_email | Mary@comp.com | — |
| Invoice_Address | 51 Regency Tower | 310 Rawlins Road |

TABLE 4 is an exemplary database 316d that is utilized to maintain information regarding the syndicate members 110. The information includes membership identification (e.g., SynMembID, SynMemb_Name, ID_Card_No) and address information (e.g., SynMemb_Add, SynMemb_Email_Add, etc.). Furthermore, billing information, such as payor (e.g., Billing_Type) and credit card information, associated with the syndicate members 110 may be maintained. Other related contact information (e.g., telephone number, customer primary device type, and home location) may be maintained in the syndicate member database 316d. Desired service information, such as SynMemb_Share_Profile, may also be included in syndicate member database 316d.

TABLE 4

Syndicate Member Database

| Data Elements | Data | | |
|---|---|---|---|
| SynMembID | SM098 | SM525 | SM546 |
| SynMemb_Name | Peter Jones | Tania Atkinson | Gordon Steiner |
| SynMemb_Add | 653 Lovers Lane | 5363 Preston Road | 5353 El Camino Real |
| Primary_Syndicate | 87387 | 87387 | 87387 |
| Secondary Syndicate | — | — | 89001 |
| Join_Date | 1/1/02 | 1/5/02 | 2/14/02 |
| ID_Card_No | SM5388703 | SM8652137 | SM2454557 |
| SynMemb_Tel_No | 650-555-1212 | 214-555-1212 | 214-555-1213 |
| SynMemb_Email_Add | pjones@oracles.com | tanaccky@atlas.com | Gords@trin.com |
| Website_Login | peterj@mycorporateclipper.net | tana@mycorporateclipper.net | gordons@mycorpateclipper.net |
| Allow_Shared_Flight | Y | N | Y |
| Allow_Nom_Shared_Flight | Y | Y | Y |
| SynMemb_Home_Loc | Sunnyvale | Dallas | Mixed |
| Billing_Type | Employer | Individual | Individual |
| CC_Card | — | VISA 353532526 | AMEX 53253535 |
| Contract_Type | Employer001 | Individual002 | Individual002 |
| SynMemb_Primary_Device_Type | Blackberry | WAP Phone | Blackberry |

TABLE 4-continued

Syndicate Member Database

| Data Elements | Data | | |
|---|---|---|---|
| Client_Installed | Y | Y | Y |
| SynMemb_Share_Profile | All | Exclusive | All |
| SynMemb_Tax_Flag | High | Sensitive | Mix |
| Admin_Delegate | Mary | — | — |
| Admin_Email | Mary@comp.com | — | — |
| Sync_Outlook_Sched | Y | Y | — |

TABLE 5 is an exemplary database that is utilized to maintain information regarding the nominated members 118. The database includes identification information, such as Nom_Pass_Name, Nom_PassID and ID_card, related to the fractional operator 102. The identification information is maintained for security purposes among other business reasons. Contact information, such as home address, phone number, and email address is also included so that the fractional operator may contact the nominated member in a variety of ways to provide booking information or schedule changes, for example. Further, flight history information, such as Total_Flights_To_Date and Total_Rev_Year, may be maintained to allow the fractional operator 102 to provide awards to the nominated members 118 based on number of flights, for example. In one embodiment, if a nominated member 118 flies ten times, then the nominated member 118 is allowed to enter his or her schedule into the schedule database. The fractional operator server 302 may search to determine if a flight is available that matches the entered schedule, and, if so, notify the nominated member 118.

Billing information of the nominated member 118 also in maintained to allow the fractional operator 102 to bill the nominated member 118 on behalf of the fractional owner 108. As discussed, the price of the seat on a per flight basis may be set by the fractional owner 108. Because the fractional operator 102 is operating the aircraft 104 under an FAA certificate allowing for the sale of capacity (e.g., seats), the fractional operator 102 may bill the nominated member 118 directly for the seat without having the fractional owner 108 be involved in the transaction.

TABLE 5

Nominated Member Database

| Data Element | Data | | |
|---|---|---|---|
| Nom_PassID | NP876 | NP342 | NP423 |
| Nom_Pass_Name | Mike Puig | Tony Smith | Pam Nelson |
| Cust_Add | 512 Riverside | 675 Oscar Lane | 624 Shipyard Drive |
| Nominating_Owner | 4144 | 1222 | 9299 |
| Nominating_Syndicate | | | 89001 |
| Website_Login | mpuig@mycorporateclipper.net | tsmith@mycorporateclipper.net | Pnelson@mycorporateclipper.net |
| Nom_Date | 1/4/02 | 4/5/02 | 4/14/02 |
| ID_card | NM52525 | NM0018 | NM52555 |
| Nom_Tel_No | 750-555-1212 | 514-555-1212 | 214-555-1999 |
| Nom_Email_Add | puig@hotmail.com | tsmith@jones.com | Pam@tmc.com |
| Total_Flights_To_Date | 1 | 4 | 11 |
| Total_Rev_Year | 500 | 1,000 | 3,200 |
| Billing_Type | Indiv | Indiv | Indiv |
| CC_Card | AMEX 87638763 | VISA 353532526 | AMEX 53253535 |
| Nom_Primary_Device_Type | Blackberry | WAP Phone | Blackberry |
| Frac_Oper_Client_Installed | Y | Y | Y |
| Cust_Tax_Flag | Indiv | Indiv | Indiv |
| Admin_Delegate | Mary | None | — |
| Admin_Email | mary@comp.com | — | — |
| Sync_Outlook_Sched | N | N | Y |

TABLE 6 is an exemplary database 316e utilized to maintain pilot information associated with the fractional operator 102. The information may include information of concern to employers of pilots as understood in the art. Because the fractional operator 102 provides flight services to fractional owners 108 and syndicate members 110, within a certain time window (e.g., within eight hours), contact information, such as pager address, mobile phone address, etc., is maintained. Additionally, fractional owners 108 may specify certain physical attributes, such as age and gender, that is desired or required for the flights, so such information may be maintained in the pilot database 316e. Because pilots must be certified to fly certain aircraft, certification information should be maintained so that the fractional operator 102 may more easily match aircraft assets with available pilots.

TABLE 6

Pilot Database

| Data Element | Data | | | | |
|---|---|---|---|---|---|
| PilotID | P001 | P002 | P099 | P002 | P089 |
| Pilot_Name | John Doe | Willy Brown | Jane Doe | Eileen Dover | Broke Meandad |
| Pilot_Add | 4255 Smith Road | 5353 John Rd | 43 Oak Pine, Apt 2 | 65 Really Lane | 5252 Wishful Lane |
| Current_Location | Air | Dal | SJC | Unavailable | Dal |
| Pilot_Pager_Add | 214-555-6161 | — | — | 214-525-4545 | — |
| Primary_Dev_Type | Desktop PC | Blackberry | Pocket PC | WAP | Blackberry |
| ID_Card | P3235 | P63263 | P66363 | P53253 | P8338 |
| Age | 37 | 42 | 29 | 57 | 52 |
| Sex | M | M | F | F | M |
| LicID_FAA | 6262 | 26262 | 6353 | 8880 | 987 |
| Re_Cert_Date | 8/3/2003 | 7/14/2002 | 1/5/2004 | 4/18/2003 | 9/11/2004 |
| Salary | $82,000 | $92,000 | $68,000 | $118,000 | $102,000 |
| Overtime | 5 | 5 | 5 | 6 | 5 |
| Standby_Hours | 10 | 10 | 10 | 12 | 15 |
| Type_Certs | L60, Challenger | L60 | L60 | L60 | L60, Challenger |
| Clearance_Level | 3 | 3 | 2 | 4 | 3 |

TABLE 7 is an exemplary database 316*f* utilized to maintain information regarding aircraft 104 operated by the fractional operator 102. The information may include identification information, such as aircraft identifier, type, and manufacturer serial number. Specific operational information (e.g., hours of flight) that provides the fractional operator 102 with the ability to determine maintenance requirements, tax information (e.g., depreciation), and other financial data (e.g., purchase price) also is stored in the aircraft database.

TABLE 7

Aircraft Database

| Data Elements | Data | | |
|---|---|---|---|
| Aircraft_ID | SJS7665 | SJS5353 | SJS0867 |
| Type | Lear60 | Lear60 | Challenger |
| Mcf_Serial_Num | 876328763 | 7612376213 | 87621387623 |
| Service_Date | 8/28/01 | 9/24/01 | 12/12/01 |
| Base | DAL | DAL | SJC |
| Current_Location | SJC | DAL | Maintenance |
| Track_Type | — | — | — |
| Purchase_Price | $1,200,000 | $4,500,000 | $21,000,000 |
| Int_Sched | D | C | A |
| Next_Maint_Date | 8/28/02 | 12/14/02 | 6/8/02 |
| Hours | 14000 | 21878 | 24222 |

TABLE 8 is an exemplary database 316*g* utilized to maintain booking information of the aircraft 104 by the fractional owners 108 or syndicate members 110. The booking information may include information related to the other databases, including customer identification and sharing information (e.g., exclusive or shared). The booking database also includes flight time information as requested by a fractional owner 108, for example, and contact information in the home and visiting cities. Preference information, such as food and transport requests, also may be maintained in the booking database stored in the operational database 502.

TABLE 8

Booking Database

| Data Elements | Data | | |
|---|---|---|---|
| Schedule_Entry_ID | SC000000001 | SC000000002 | SC000000003 |
| Customer_ID | 4144 | 9299 | 1222 |
| Exclusive | Y | N | N |
| Shared | N | Y | N |
| Seats_Required | 2 | 1 | 3 |
| Syndicate_Member_ID | — | SY098 | — |
| Nominated_ID | | | NOM73737 |
| Nominated_Family | Yes, wife Julie | | |
| Date_Out_1 | 3/4/02 | 6/7/02 | 3/4/02 |
| Time_Out_1 | 7:00 | 21:00 | 8:15 |
| Zone_1 | CST | CST | CST |
| Date_Out_2 | 3/4/02 | 6/7/02 | 3/4/02 |
| Time_Out_2 | 8:00 | 21:30 | 8:15 |
| Zone_2 | CST | CST | CST |
| Date_Rtn_1 | — | — | 3/8/02 |
| Time_Rtn_1 | — | — | 17:00 |
| Zone_2 | — | — | EST |
| From_City | DAL | DAL | DAL |
| To_City | SJC | NYC | MIA |
| Best_Contact_Device | WAP | DesktopPC | Blackberry |
| Secondary_Contact | Rosie Ann | — | — |
| Secondary_Contact_Tel | 214-555-1212 | — | — |
| Food_Request | Turkey, Salmon, White Wine | — | Turkey, Beef, Tuna |
| Transport_Request | Limo | Rental Car | Not Req'd |

While the databases may be utilized to maintain information regarding identification, traveling preferences, and booking, for example, customers of the fractional ownership program may be most concerned about the financing and costs of becoming a fractional owner 108 or syndicate member 110.

TABLE 9 is an exemplary database 316*h* utilized to maintain monthly fees, including fixed and variables, and utilization of the aircraft 104. In the case of the fractional owner 108 being a syndicate 108*a*, the usage fees associated with the syndicate members 110 may be apportioned to the syndicate members 110 based on utilization. In other words, the fractional operator 102 may perform accounting responsibilities on behalf of the fractional owners 108. If, for example, the fractional owner is a syndicate 108*a*, then the apportionment of the usage fees by the syndicate members 110 may be performed by the fractional operator 102 rather than relying on the syndicate 108a, which may be a partnership that is formed simply to be a fractional owner 108 of the aircraft 104, but without the means or desire to perform such accounting functions.

Additionally, according to the principles of the present invention, the fractional owners 108 and/or syndicate members 110 may be interested in how the program as set forth may be utilized to reduce ownership fees. As the average fractional ownership flights have 2.8 persons on an aircraft during a flight, much potential revenue is lost due to vacancy of available capacity (i.e., seats and cargo space). From the viewpoint of a fractional owner 108, reselling of the available capacity of the aircraft 104 to other fractional owners 108 and syndicate members 110 during flights may be desirable to reduce usage fees for the booking fractional owners 108 and syndicate members 110. The fractional owner 108b who schedules the flight sets the rate to charge the other fractional owners 108 and syndicate members 110 who share the aircraft 104. The databases may include information regarding allocated capacity fees for reselling the available capacity. In one embodiment, the reselling of a seat to another passenger (i.e., fractional owner, syndicate member, and/or nominated member), may be a fixed fee, such as $500. Alternatively, the reselling of a seat may be based on a market factor, such as the variable fees for the month. Still yet, the reselling of cargo space may be set by the fractional owner 108 and related information may be maintained in the databases associated with the fractional owner 108.

It should be understood that the fractional operator 102 may charge booking fees and such fee structures may additionally be included in the pricing database. For example, the fractional operator 102 may charge a flat fee of ten percent for each of the fractional owners 108 and/or syndicate members 110. In one embodiment, the booking fees may be variable and based on the process utilized to actively market or resell the available capacity for the booking fractional owner 108 or syndicate member 110 who booked the aircraft 104.

The information maintained in the pricing database may be utilized by the fractional owner 102 to compute the billing information. In computing the billing information, the monthly fixed fees, monthly variable fees, usage, and resold capacity may be utilized to compute a total bill for a given month. For example, the fractional owner 108, Bob Smith, is a quarter-share owner in the aircraft 104. The monthly fixed fees are $22,000 and the monthly variable fees are $36,645 for three flights per month (assuming seven-hour round trip flights). The capacity resold may be set at $600 per seat, so that if he is unable to use the two remaining flights for the month, he may resell that usage to another fractional owner or syndicate member 110 and recapture some revenue therefrom. Ultimately, this reselling of available capacity to fractional owners 108 and syndicate members 110 may allow the fractional owner 108 to offset usage fees or even make a profit. It should be understood that by utilizing the aircraft 104 as described may not impact tax considerations for the fractional owners 108 if certain rules are followed. While the tax implications for operating a fractional aircraft are complex, abiding by the rules allows the fractional operator 102 to depreciate the aircraft 104 according to a seven or twelve year schedule, for example, as desired by the fractional owners 108.

Because the information is maintained in the operational database 502 located in the fractional operator server 302, which is coupled to the network 304, the fractional operator 102 is able to provide fractional owners 108, syndicate members 110, and nominated members 118 with access to the information. In one embodiment, the information may be posted to a webpage associated with each individual customer of the fractional operator 102. Alternatively, a voice portal may be utilized to provide detailed booking and account information, for example. For the fractional owners 108 and syndicate members 110, the information may be provided in a searchable format to indicate what flights are available with capacity for sharing or payment based on the per seat rate set by the booking fractional owner 108 or syndicate member 110.

TABLE 9

Pricing Database

| Fractional Owners | Syndicate Members | Ownership Percentage | Monthly Fixed Fees | Max Projected Monthly Variable Fees | Flights Per Month | Used Flights Current Month | Capacity Resold |
|---|---|---|---|---|---|---|---|
| Bob Smith | | 25% | $22,000 | $36,645 | 3 | 1 | $6,600 |
| Debra Day | | 25% | $22,000 | $36,645 | 3 | 2 | $4,400 |
| Steve Jones | | 25% | $22,000 | $36,645 | 3 | 2 | $0 |
| Group One | Tom Malay | 25% | $7,333 | $12,215 | 1 | 1 | $0 |
| | Dan Savage | | $7,333 | $12,215 | 1 | 0 | $2,500 |
| | Iry Wigdor | | $7,333 | $12,215 | 1 | 0 | $1,500 |

Figure 6:
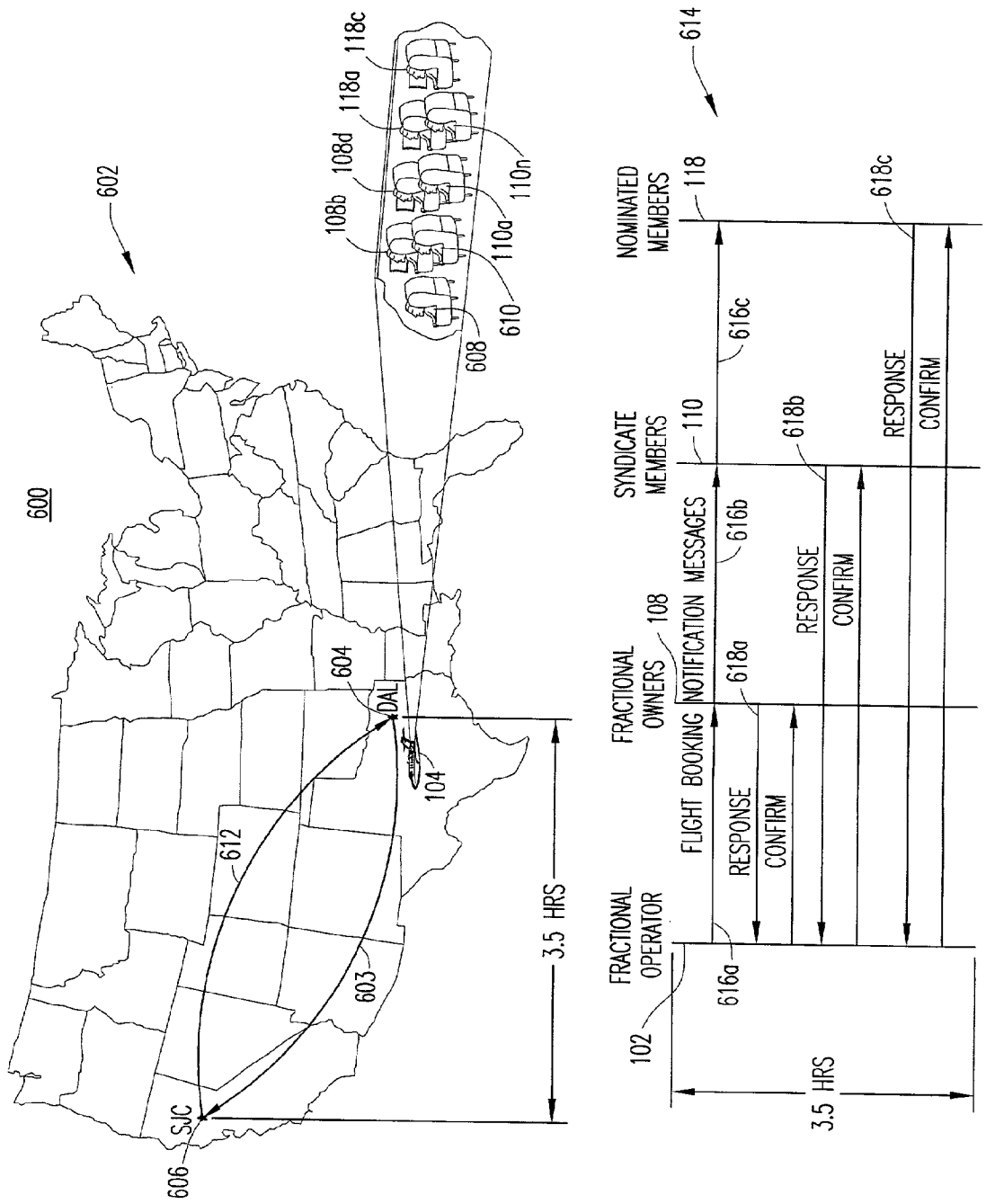
FIG. 6 is an exemplary diagram indicative of reselling available capacity on the aircraft utilizing the databases and communication infrastructure of FIG. 3.

FIG. 6 is an exemplary diagram 600 indicative of reselling available capacity on the aircraft 104 utilizing the databases 316 and communication infrastructure 300 of FIG. 3. In the instant example, as shown on the United States map 602, the aircraft 104 takes off from Dallas (DAL), Tex. 604 and flies an originating Flight 603 to San Jose (SJC), Calif. 606. The aircraft 104 is an eight seat jet and is booked by the fractional owner 108b. The fractional owner 108b takes a companion 608, such as his spouse, along. In this case, the companion 608 flies for free because the companion 608 is not a nominated member 118.

The fractional owner 108b has a booking window of six hours as per the contract 112, which provides the fractional operator 102 six hours to fill available capacity of the aircraft 104 for the flight. To fill the aircraft 104, the fractional operator 102 targets potential passengers, such as the other fractional owners 108 and syndicate members 110, utilizing the contact information, such as email addresses and telephone numbers, stored in the databases 316 via the communication infrastructure 300.

Referring to FIG. 7A, for example, an electronic message, such as a page or email, may be communicated to the potential passengers (i.e., fractional owners 108 and syndicate members 110). As shown, the potential passengers may have a mobile wireless device 308a, such as a mobile phone or two-way pager, to receive and send emails notifying the potential passenger of the flight. In attempting to fill the plane with passengers and/or cargo, the fractional operator 102 may send a global email to all of the potential passengers or may send the message according to rules, such as "offer available capacity to fractional owners first, then syndicate members, and finally nominated members associated with the booking fractional owner or syndicate member", as established by the fractional operator 102.

An email message 702 may be communicated to the mobile wireless device 308a utilized by a fractional owner 108 and/or syndicate member 110. In accordance with the agreement between the fractional owner 108b who booked the flight and fractional operator 102, the email message 702 can include terms of purchasing the available capacity. For example, an available seat may be indicated in the message 702 as being available for a fixed fee of $500. The potential passenger may respond to the email message 702 via a reply email. If the potential passenger responds in the affirmative, then upon receipt of the request to purchase the available capacity (e.g., seat) by the fractional operator server 302, the fractional operator 102 may book the flight for the potential passenger and transmit a confirmation 706 to the purchaser via an email message as seen on FIG. 7B. It should be understood that such messages could be performed by the fractional operator 102 simply making telephone calls and booking the flights. Similarly, a website or other networked address could be utilized to notify the potential passengers having had a background check and receiving identification cards 116 issued by the fractional operator 102 of flight plans as booked by other fractional owners 108 and syndicate members 110.

Referring again to FIG. 6, the fractional operator 102 is successful in filling the available seats of the outbound flight of the aircraft 104 from Dallas 604 to San Jose 606. As shown, the remaining six seats are filled with passengers, including fractional owner 108d and guest 610, syndicate members 110a and 110n, and nominated members 118a and 118c. The nominated members 118a and 118c were nominated by the booking fractional owner 108b. In terms of managing of revenue by the fractional operator 102, the fractional owner 108b may be charged according to the contract 112 against a monthly management fee and at a variable hourly fee for the flight. The nominated members 118a and 118c may be charged a per seat fee set by the booking owner 108b. The fractional owner 108d, who is sharing the flight with the booking fractional owner 108b, may be charged on a per seat basis as specified by the fractional operator 102. Likewise, the syndicate members 110a and 110n pay the price per seat as specified by the fractional operator 102.

Corresponding to the flight time of three and one-half hours of the aircraft 104 between Dallas 604 and San Jose 606, the fractional operator 102 may attempt to book potential passengers for the return flight 612 (i.e., dead-head) of the aircraft 104 as the fractional owner 108b plans on returning at a later date. An interaction diagram 614 is exemplary of a methodology for the fractional operator 102 to sell the available capacity for the return flight 612. Flight booking notification messages 616a-616c (collectively 616) may be communicated from the fractional operator 102 to the fractional owners 108 and syndicate members 110. Each of the recipients of the messages may respond via responses 618a-618c (collectively 618), respectively, indicating whether or not the respective prospective passenger would like to purchase available capacity. It should be understood that since each of the fractional owners 108 are independent, that the fractional owners 108 may utilize their usage rights without paying the price set by the booking fractional owner 108 or syndicate member 110.

FIGS. 8-16 are exemplary flow diagrams describing rules for the fractional operator of FIG. 1 to manage the fractional ownership program according to the principles of the present invention. The rules may be maintained by the rules database 504 and/or implemented in software as a codified program utilizing software programming techniques as understood in the art. In FIG. 8 the process for performing schedule management starts at step 800. At step 802, a schedule is updated by the fractional owner 108 or syndicate member 110. A schedule of the fractional owner 108 is added to the schedule database 316g at step 804. In one embodiment, a nominated member 118 having ten or more flights may enter have a schedule into the schedule database 316g at step 806. By the nominated member 118 having the schedule entered, existing booked flights of the nominating fractional owner 108 or syndicate member 110 may be identified to the nominated member 118. The schedule of the nominated member 118 has been added to the schedule database 316g at step 804. The schedule optimizer scans current scheduled flights to determine if any matches exist that coincide with the schedule of the fractional owner 108 and/or nominated member 118 at step 808.

At step 810, a determination is made as whether there are more than five owners 'thinking' of flying at a close time. If not, then at step 812, a selling and booking of a flight of the aircraft 104 for the fractional owner 108 or syndicate member 110 is performed. At step 814, booking and marketing functions are performed by the fractional operator 102, where the booking and marketing functions include notifying other fractional owners 108 and syndicate members 110 of the scheduled flight of the aircraft 104.

If a determination at step 810 is made that there are more than five owners thinking of flying at a close time, then the reconfirmation of interests in the times, cities, etc., is made at step 816 by the fractional operator 102. At step 820, a determination is made as to whether there are still more than five passengers with more than five hours before the flight time. If the determination is negative, then the schedule optimization is closed at step 822. Notification to the scheduling fractional owners 108, syndicate members 110, and/or nominated members 118 with the pending schedule in the schedule database 316g as determined by the fractional operator server 302.

If a positive determination is made at step 820, then the fractional operator server 202 sets the price for the fractional owners 108, syndicate members 110, and/or nominating members 118. In setting the price for the passengers, the fractional operator server 302 splits the hours used for the fractional owners 108 and syndicate members 110 at step 828. At step 830, the fractional operator server 302 performs invoicing functions according to the contract 112 between the fractional operator 102 and fractional owners 108 and as understood in the art. Additionally, the fractional operator server 302 computes the price for each nominated member 118 to pay on a per seat fee for each segment of flight as specified by the nominating fractional owner 108 and/or syndicate member 110. At step 834, the fractional operator server 302 performs invoicing, notification, and distributing revenue functions to the fractional owners 108 and/or syndicate members 110. The process ends at step 836.

FIG. 9 is a exemplary flow diagram 900 describing rules for the fractional operator 102 of FIG. 1 to manage the fractional ownership program according to the principles of the present invention. The booking process of the fractional operator 102 starts at step 902. At step 904, a fractional owner 108 or syndicate member 110 books one or more flights per a contract 112. At step 906, the fractional operator 102 performs a load balancing service for the syndicate members 108. In performing the load balancing service, the fractional operator 102 monitors and maintains an accurate accounting of usage of the aircraft 104 by the syndicate members 110. At step 908, a determination is made as to whether fee paying passengers, such as nominated members 118, are travelling with the fractional owner 108 or syndicate member 110. If not, then a determination is made at step 910 as to whether the flight is to be remarketed to other fractional owners 108 and syndicate members 110 based on a sharing option selected by the booking fractional owner 108 or syndicated member 110 stored in the customer database 316b. Once the flight is booked for the fractional owner 108 or syndicate member 110, normal cancellation rules are applied to the booking at step 912.

If at step 908, it is determined that a fee paying passenger is travelling with the fractional owner 108 or syndicate member 110, the fractional operator server 302 determines the price set by the fractional owner 108 or syndicate member 110 at step 912. At step 914, a price for the fee paying passenger(s) is set in invoicing tables as established by the booking fractional owner 108 or syndicate member 110. At step 910, a determination is made as to whether the flight is to be remarketed to other fractional owners 108 and syndicate members 110 based on the sharing option selected by the booking fractional owner 108 or syndicate member 110, available capacity of the aircraft 104 is submitted to marketing at step 914. At step 916, a determination is made as to whether marketing has filled any available capacity for the booking fractional owner 108 or syndicate member 110 before a pre-established flight 'lock'. The pre-established flight lock may be set for three hours, for example, as established in the contract 112. If the available capacity (e.g., seats) are filled within the pre-established flight lock time, then at step 918, non-cancel rules apply to the booking fractional owner 108 or syndicate member 110 as per the contract 112. At step 920, if the booking fractional owner 108 or syndicate member 110 cancels within the pre-established flight lock time, then all allocated capacity fees are applied to the fractional owner 108 or syndicate member 110 by the fractional operator 102 and the plane flights. It should be understood that the booking includes ordering food, service, and other requests per the contract 112.

FIG. 10 is an exemplary flow diagram 1000 for marketing available capacity of the aircraft 104 to fractional owners 108 and syndicate members 110. The process starts at step 1002. At step 1004, both flights of the aircraft 104 are added to the flight schedule database 316g by the fractional operator server 302. At step 1006, a determination is made as to whether nominated members 118 have been notified. If the nominated members 118 have not been notified, a determination is made at step 1008 as to whether the flight is to be exclusive or shared by the booking fractional owner 108 or syndicate member 110. If the flight is to be exclusive, then no marketing to other fractional owners 108 or syndicate members 110 is to be performed at step 1010. If the booking fractional owner 108 or syndicate member 110 indicates that the flight may be shared, then available capacity of the aircraft 104 is remarketed to the other fractional owners 108 and syndicate members 110. In remarketing the available capacity of the aircraft 104, a message sent to the other fractional owners 108 and syndicate members 110 includes time, city, price, etc., of the booked flight as set by the booking fractional owner 108 or syndicate member 110.

At step 1014, a determination is made as to whether the remarketing effort of step 1012 booked more than two people on the flight before the three-hour lock time. If not, then the flight may be cancelled at step 1016. Alternatively, the flight is fixed and the booking fractional owners 108 and/or syndicate members 110 are notified at step 1018. The standard booking rules apply in terms of cancellation.

If, at step 1006, the nominated members 118 were advised, a determination is made at step 1020 as to whether the nominated members 118 have security clearances. If not, then the security clearance and identification rules (FIG. 11) are processed at step 1024. Otherwise, the flight booking and pricing is confirmed at step 1022 for the nominated members 118. At step 1026, the fractional operator 102 confirms the booking for invoicing the fractional owners 108, syndicate members 110, and/or nominated members 118 who are booked as passengers. Additionally, a flight security identification card 116 is issued. The process ends at step 1028.

FIG. 11 is an exemplary flow diagram 1100 for providing security clearances for the fractional owners 108, syndicate members 110, and nominated members 118 according to the principles of the present invention. The process starts at step 1102. At step 1104, fractional owners 108, syndicate members 110, and nominated members 118 are identified as being required to have a background check performed to obtain a security clearance to board the aircraft 104. Typically, the background check for a nominated member 118 may be performed on a last minute basis as the fractional owners 108 and syndicate members 110 have needs to share the aircraft 104 with business associates or other passengers. The background check may include, but is not limited to, identity, criminal background, nationality, resident status, veracity, and credit. By requiring the background checks to be performed on passengers who pay allocated capacity fees, other fractional owners 108 and syndicate members 110 may have confidence in knowing that individuals paying for allocated capacity fees either in time or on a per seat basis, may be trusted to a standard level as dictated by the fractional operator 102. Additionally, by performing the background checks on paying passengers, including fractional owners 108, syndicate members 110, and nominated members 118, other those booking the aircraft may be comfortable with safety. Command and control as understood in the art is maintained by the booking fractional owner 108 or syndicate member 110 dictating terms of the flight, thereby providing the fractional owners 108 and syndicate members 110 with tax benefits for ownership of the aircraft under the appropriate FAA regulations (e.g., FAR Part 135).

A security form is sent to the individual applying for the background check at step 1106. At step 1108, a determination is made as to whether the security form is received at least three hours prior to departure. It should be understood that other minimum times may be utilized, but that the minimum time for receiving the security form should allow for the appropriate background check as defined by the fractional operator 102 and/or FAA regulations. If the security form is not received at least three hours prior to departure, then an 'add-fee', such as $300, is applied to the account of the fractional owner 108 or syndicate member 110. Accordingly, if the individual clears the background check, the security clearance may be delivered to the apron prior to boarding the aircraft 104. If the security form is received at least three hours prior to the departure, then criminal and credit background checks are performed at step 1112.

Upon obtaining the results of the background check, a determination is made at step 1114 as to whether the individual successfully passed the background check. If not, a second level background check may be performed by the fractional operator 102 or third party at step 1116. If it is determined that the individual does not pass the second level background check at step 1118, then the individual is rejected, the fractional owner 108 or syndicate member 110 notified, and a processing fee is obtained at step 1120. If it is determined that the individual passes the second level background check at step 1118, then the identification card 116 is issued, a credit card may be held on file, and login and ownership and/or membership is started at step 1122. If it is determined that the individual passes the background check at step 1114, then a second level background check at step 1116 is not performed and the identification card 116 is issues, credit card is held on file, and login and ownership and/or membership is started at step 1122. The process ends at step 1124.

FIG. 12 is an exemplary flow diagram 1200 for utilizing the identification card 116 issued upon successfully completing the background check of FIG. 11. The process starts at step 1202. At step 1204, the potential passengers (i.e., fractional owners 108, syndicate members 110, and/or nominated members 118) arrive to the aircraft 104 with the identification cards 116. At step 1206, the captain of the aircraft 104 or other personnel of the fractional operator 102 greets the potential passengers and checks the associated identification cards 116. A determination is made at step 1208 as to whether any of the potential passengers are without an identification card 116 issued by the fractional operator 102. If so, then a background check rush fee (e.g., $300) may be assessed to the potential passenger without the identification card 116. Assuming the potential passenger passes the background check as performed by the process of FIG. 11, the potential passenger signs a form agreeing to pay the background check rush fee with a credit card at step 1212.

Once all of the fee paying passengers, including the fractional owners 108, syndicate members 110, and/or nominated members 118, have been cleared by the pilot, a baggage check and sign-off is performed at step 1214 as understood in the art. At step 1216, the final sign-in and any other security questions are performed. The pilot makes introductions and security briefing to the passengers at step 1218. If any ground travel arrangements are needed for the passengers at the arrival city, the fractional operator 102 may perform such arrangements at step 1220. Otherwise, the pilot files the manifest and finances are updated by the fractional operator 102 at step 1222. In updating the finances, the fractional operator 102 applies the flight time to the fractional owners 108 and/or syndicated members 110 who either booked the flight or elected to utilize flight time to pay for the flight. In the case of the fractional owners 108 and/or syndicate members 110 paying for the flight on a per seat basis as set by the booking fractional owner 108 or syndicate member 110, the charges are applied to the appropriate passengers on behalf of the fractional owner 108. Additionally, the nominated members 118 are charged for the seat as set by the nominating fractional owner 108 or syndicate member 110. The process ends at step 1224.

FIG. 13 is an exemplary flow diagram 1300 for providing security at landing by the fractional operator 102 of FIG. 1. The process starts at step 1302. At step 1304, the aircraft 104 arrives at the arrival airport. The passengers may complete a simple question and answer form or verbal communication with the pilot or other personnel of the fractional operator 102 at step 1306. A determination is made at step 1308 as to whether any of the passengers had any security or other issues. If no issues of the passengers exist, then the flight is closed, inventory verified, and transportation for passengers ensured at step 1310. If an issue did exist, then the issue(s) are resolved at the apron 1314 and any necessary customer service follow up is performed by the fractional operator 118 at step 1316. Inventory and food usage is completed and closed by the fractional operator 102 at step 1312, and the process ends at step 1314.

FIG. 14 is an exemplary flow diagram 1400 for the fractional operator 102 to perform invoicing and financing duties according to the contract 112 of FIG. 1. The process starts at step 1402. At step 1404, data from the flight operations associated with flight hours and services provided to the passengers are collected. In one embodiment, the information is collected by the fractional operator server 302 and applied to the databases 316. A determination is made at step 1406 as to whether nominated passengers traveled on the flight(s) as booked. If not, then a determination is made at step 1408 as to whether the fractional owners 108 and/or syndicate members 110 were on flights based on a marketing effort by the fractional operator 102. If not, then the booking fractional owner 108 or syndicate member 110 is invoiced according to the contract 112 at step 1410.

If at step 1408 it is determined that a fractional owner 108 and/or syndicate member 110 are booked from marketing efforts by the fractional operator 102, then per seat fees as set by the booking fractional owner 108 and/or syndicate member 110 appropriately are applied to the accounts of those fractional owner 108 and/or syndicate members 110 who utilized the available capacity of the flights at step 1412. At step 1414, a calculation of the revenue generated by selling the available capacity less administration costs is made. The booking fractional owner 108 and/or syndicate member 110 account(s) are credited based on the sale of excess capacity at step 1416. At step 1418, a statement for the fractional owners 108 and syndicate members 110 is sent at the end of the month. Alternatively and/or additionally, a statement is updated online within an hour of a flight landing.

If at step 1406 it is determined that passengers who are nominated members 118 are booked on the trip as booked, then invoice data for the specific flight is reviewed at step 1420. At step 1422, a calculation is performed to determine revenue generated by the nominated members 118. The nominated member(s) 118 are invoiced and billed to the credit card on file at step 1424. The account of the fractional owner 108 is credited based on the revenue generate by the sharing passengers (i.e., fractional owners 108, syndicate members 110, and/or nominated members 118) at step 1416 and the statements are sent as previously discussed at step 1418. The invoicing and financing process ends at step 1426.

FIG. 15 is another exemplary flow diagram 1500 providing additional rules for performing invoicing and financing by the fractional operator of FIG. 1. The process starts at step 1502. At step 1504, a booking is reviewed if made by a syndicate member 110. If it is determined that the flight booked does not exceed the percentage interest in terms of flight time allotted to the syndicate member 110 at step 1506, then the booking is performed at step 1508. Alternatively, the booking rules for syndicate members 110 exceeding the percentage interest is reviewed at step 1510. A determination is made at step 1512 as to whether other passengers, including syndicate members and nominated members 118, need to be booked for the flight. If not, then a determination is made at step 1514 as to whether monthly and variable hours in a month are to be adjusted. If not, then the flight is booked for the syndicate member 110 at step 1516. If the monthly and variable hours need to be adjusted for the syndicate member 110, then the accounts of the syndicate member 110 are adjusted at step 1518.

If it is determined at step 1512 that other passengers need to be booked for the flight, then approvals are made and a flight is reserved during booking at step 1520. Once the passengers are approved, the flight is confirmed at step 1522. The process continues at step 1514 as discussed and ends at step 1524.

FIG. 16 is an exemplary flow diagram 1600 providing for remarketing an ownership percentage of a syndicate member 110 by the fractional operator 102 of FIG. 1. The process starts at step 1602. At step 1604, the syndicate member 110 notifies the fractional operator 102 of a desire to sell the ownership interests in the fractional owner/syndicate 108a. At step 1606, a determination is made as to whether the syndicate member 110 is becoming a fractional owner 108 and staying in the fractional ownership program provided by the fractional operator 102. If not, then a maximum fee may be applied to the syndicate member 110 and the fractional operator 102 markets the ownership interest of the syndicate member 110 to the nominated members 118 and others not currently in the fractional ownership program at step 1608. It should be understood that terms of the contract 112 containing early withdrawal fees are applied, if necessary, by the fractional operator 102 to the syndicate member 110.

At step 1610, the fractional operator 102 markets, negotiates, and sells the ownership interest of the syndicate member 110 in the fractional operator/syndicate 108. The original contract 112 is revised or a new contract 112 is formed. The purchaser of the ownership interest of the syndicate member 110 is issued an identification card 116 upon completion of a background check according to FIG. 11. At step 1612, the marketing and commission fees are invoiced to the syndicate member 110 who sold the ownership interest according to the terms of the contract 112 between the fractional operator 102 and syndicate member 110. If at step 1606, it is determined that the syndicate member 110 is becoming a fractional owner 108 and staying in the fraction ownership program of the fractional operator 102, then a minimum fee may be applied to the syndicate member 110 and the ownership interest is marketed to the nominated members 118 and others who are not currently in the fraction ownership program.

It should be understood that the rules provided are exemplary and that additional and/or alternative rules may be utilized by the fractional operator 102 in operating and performing the principles of the present invention. It should also be understood that the fractional operator server 302 may be utilized in performing maintenance of the databases 316. However, the rules and/or databases 316 may be implemented using other techniques. For example, the information stored in the databases 316 may be stored at various points within the network 304 so that local processing may be performed. Additionally, if a third party service provider (not shown) is utilized by the fractional operator 102 in performing some of the duties, such as background checks, the information in the databases 316 may be shared with or located at the third-party service provider.

The previous description is of preferred embodiment(s) for implementing the invention, and the scope of the invention should not necessarily be limited by this description. The scope of the present invention is instead defined by the following claims.

What is claimed is:

1. A method for operating a management computer system that coordinates flight schedules and aircraft capacity on one or more fractionally owned aircraft, said method comprising:
providing electronic information regarding one or more fractional owned aircraft to be managed by the management computer system to the management computer system, said electronic information regarding one or more fractional owned aircraft including aircraft identification information,
providing electronic information to the management computer system regarding a plurality of owners of each of said one or more fractional owned aircraft, said plurality of owners having shared access and control over each of said one or more fractional owned aircraft, and said electronic information regarding a plurality of owners including owner identification information and authorization information allowing the owner to reserve the fractional owned aircraft for a potential flight:
providing electronic information to the management computer system regarding one or more members of a managed group upon registration of said one or more members with the managed group, each of said members of said managed group being a potential passenger on a future flight using the fractional aircraft to be reserved in the future by said one or more owners, said information including personal information regarding the member, address information, location information, said management computer system coordinating flight and aircraft capacity of the fractionally owned aircraft and notifying selected members of a managed group about available aircraft capacity on one or more fractional owned aircraft reserved by one of said owners, wherein said selected members of the managed group includes only a certain subset of all the owners and members that have registered with the management computer system;
receiving an electronic booking request by the management computer system from one or more owners of said one or more of the fractional owned aircraft, said management computer system processing the booking request from one or more of said owners to reserve one of the fractionally owned aircraft for a specified flight;
providing potential passenger criteria information in an electronic form to the management computer system, said potential passenger criteria information is specified by the owner reserving one or more fractional aircraft to describe the characteristics of potential members of the managed group that said owner would most prefer to have the management computer system offer available aircraft capacity on said fractional owned aircraft reserved by the owner;
comparing performed by the management computer system of the potential passenger criteria information against the information regarding members provided to the management computer system to determine which members of the managed group best fit the potential passenger criteria provided to the management computer system, said comparison resulting into said select subset of members of the managed group that are closely correlated to the potential passenger criteria, said select subset of members being notified about available capacity on the flight booked by said owner of the fractional owned aircraft;
transmitting an electronic communication from the management computer system to said selected subset of members in the managed group based on the results of the comparison, said communication offering the selected member available aircraft capacity on the flight booked by the owner without transmitting communications to every member of the managed group;
receiving an electronic response by the management computer system from one or more of said selected members indicating that member's desire to occupy said available capacity specified in the electronic notification relating to said flight booked by the owner; and
coordinating the departure of the fractional owned aircraft reserved by the owner with the owner and one or more selected members of the managed group that affirmatively responded to the notification message transmitted by the management computer system.

2. The method according to claim 1, wherein the available aircraft capacity includes either passenger seating or freight cargo capacity on the fractional owned aircraft.

3. The method according to claim 1, wherein the qualified members include individual members or business entities members are associated with.

4. The method according to claim 1, wherein the owners of the fractionally owned aircraft have at least a partial share of ownership in said aircraft.

5. The method according to claim 1, further comprising preparing a billing statement to be sent by the management computer system to the travelers on the flight specifying flight usage fees.

6. The method according to claim 5, wherein the flight usage fees are billed proportional to use of the aircraft.

7. The method according to claim 1, wherein registering for membership to the membership group includes agreeing to a minimum time duration of usage.

8. The method according to claim 7, wherein the minimum time duration is one flight a month.

9. The method according to claim 1, further comprising providing the owners with passenger sharing options for aircraft usage.

10. The method according to claim 9, wherein the passenger sharing options consist of exclusive and shared aircraft usage.

11. The method according to claim 1, further comprising the step of:
establishing a reservation response time span when the management computer system substantially guarantees availability of the available aircraft capacity to the selected members.

12. The method according to claim 11, wherein the reservation time span is a maximum of approximately twenty-four hours.

13. The method according to claim 1, further comprising:
communicating to other fractional owners with a notification about the available capacity on the booked flight for the fractionally owned aircraft.

14. The method according to claim 1, further comprising:
reselling available capacity on the fractional owned aircraft to other fractional owners in the managed group.

15. The method according to claim 14, wherein said reselling includes selling the available capacity to an individual nominated by a fractional owner.

16. The method according to claim 1, further comprising performing a background check by the management computer system on one or more selected members receiving a notification of available capacity on the specified flight.

17. The method according to claim 16, wherein the background check includes at least one of the following:
identity, criminal background, nationality, resident status, veracity, and credit.

18. The method according to claim 1, wherein the communication to qualified members regarding available capacity on the aircraft is transmitted over an electronic network from the management computer system.

19. The method according to claim 18, wherein said communication is transmitted wirelessly to the qualified members over the electronic network.

20. The method according to claim 13, wherein the available capacity is on a deadhead portion of flight travel of the aircraft.

21. The method according to claim 1, wherein the available capacity is on a deadhead portion of flight travel of the aircraft.

22. The method according to claim 1, wherein said management computer system is capable of notifying selected members about available capacity on the aircraft on a per seat basis.

23. The method according to claim 1, wherein said management computer system uses a database to perform the comparison of the submitted criteria information against information maintained regarding said members of said managed group, said database including information associated with the fractional owners and members.

24. The method according to claim 23, wherein the database further includes contact information associated with the owners and members.

25. The method according to claim 24, wherein the contact information includes electronic contact information.

26. The method according to claim 25, wherein the electronic contact information includes wireless electronic contact information.

27. The method according to claim 26, wherein the contact information is utilized to notify the selected members of available capacity on the aircraft.

28. The method according to claim 1, wherein said management computer system is operated by a management computer system operator.

29. The method according to claim 1, wherein said management system operator is an entity other than a fractional owner.

30. The method according to claim 1, wherein said management computer system also performs accounting services related to the flight operation.

31. The method according to claim 30, wherein a billing statement is prepared by the management computer system.

32. A management computer system that supports management services for a managed group and one or more fractionally owned aircraft, said system comprising:
(1) an input/output communication port on the management computer system that receives and transmits communications related to the management computer system services, said communications include:
transmissions received by the management computer identifying one or more fractional owned aircraft to be managed by the management computer system,
transmissions received by the management computer system regarding a plurality of owners of each of said one or more fractional owned aircraft, said plurality of owners having shared access and control over each of said one or more fractional owned aircraft, said transmission including owner identification information and authorization information allowing the owner to reserve the fractional owned aircraft for a potential flight;
transmissions received by the management computer system registering one or more members of a managed group, each of said members of said managed group being a potential passenger on a future flight that uses the fractional aircraft as reserved by said one or more owners, including personal information regarding the member, address information, member location information,
booking request transmissions received by the management computer system as transmitted from one or more owners of one or more of the fractional owned aircraft; said booking request transmission processed by the management computer system to reserve one of the fractionally owned aircraft for a specified flight;
potential passenger criteria transmissions received by the management computer system as specified by the owner reserving one or more fractional aircraft, said criteria describe the characteristics of potential members of the managed group that said owner would most prefer to have the management computer system offer available aircraft capacity on said specified flight to be flown on the fractional owned aircraft;

notification transmissions sent by the management computer system to a selected subset of members in the managed group based on the results of a comparison, said notification offering the selected members available aircraft capacity on the specified flight reserved by the owner without transmitting communications to every member of the managed group;

response transmissions received by the management computer system from one or more of said selected members indicating that member's desire to occupy said available capacity on the specified flight;

(2) a database coupled to said management computer system having information related to members of the managed group, information related to one or more fractionally owned aircraft, and information related to fractional owners capable of booking said one or more fractionally owned aircraft, wherein said managed group includes fractional aircraft owners and potential passengers that have registered as members of the managed group;

(3) a comparator coupled to the database in the management computer system that compares one or more criteria for potential passengers from the members in the managed group as provided by the fractional owner, said criteria describing the characteristics of a potential passenger among the members in the managed group that said owner reserving said one of fractional owned aircraft would most prefer the management computer system to send a notification transmission offering available aircraft capacity on the specified flight, against member information retained in the database to determine the best fit for potential passengers from the members in the managed group that should be notified about available capacity on the specified flight booked on the fractionally owned aircraft, said potential passengers being a selected subset of the members in the managed group;

(4) an interactive processor that reviews the results obtained from the comparator and prepares a communication from the management computer system to said selected members of the managed group, said communication offering the selected members available aircraft capacity on the specified flight reserved by the fractional owner without transmitting communications to every member of the managed group; said processor processes said responses received by the management computer system from one or more of said selected members indicating that member's desire to occupy said available capacity on said specified flight.

33. The system according to claim 32 wherein available aircraft capacity includes passenger or freight cargo capacity on the aircraft.

34. The system according to claim 32, wherein the database supporting the management system retains information about specific passenger sharing options during aircraft usage.

35. The system according to claim 32, wherein the database stores a listing of member criteria.

36. A management computer system having a database that supports scheduling services for members in a managed group and one or more fractionally owned aircraft, comprising:

an input/output communication port for a management system that receives and transmits communications related to the management computer system services, said communications include:

transmissions received by the management computer identifying one or more fractional owned aircraft to be managed by the management computer system, transmissions received by the management computer system regarding a plurality of owners of each of said one or more fractional owned aircraft, said plurality of owners having shared access and control over each of said one or more fractional owned aircraft, said transmission including owner identification information and authorization information allowing the owner to reserve the fractional owned aircraft for a potential flight;

transmissions received by the management computer system registering one or more members of a managed group, each of said members of said managed group being a potential passenger on a future flight that uses the fractional aircraft as reserved by said one or more owners, booking request transmissions received by the management computer system as transmitted from one or more owners of one or more of the fractional owned aircraft, said booking request transmission processed by the management computer system to reserve one of the fractionally owned aircraft for a specified flight;

potential passenger criteria transmissions received by the management computer system as specified by the owner reserving one or more fractional aircraft, said criteria describe the characteristics of potential members of the managed group that said owner would most prefer to have the management computer system offer available aircraft capacity on said specified flight to be flown on the fractional owned aircraft;

notification transmissions sent by the management computer system to a selected subset of members in the managed group based on the results of a comparison, said notification offering the selected members available aircraft capacity on the specified flight reserved by the owner without transmitting communications to every member of the managed group;

response transmissions received by the management computer system from one or more of said selected members indicating that member's desire to occupy said available capacity on the specified flight;

a database coupled to said management computer system, said database possessing a list of members of the managed group, a list of one or more fractionally owned aircraft operated in such a manner to provide available aircraft capacity and a list of fractional owners capable of booking said aircraft capacity, wherein said members of the managed group includes owners of each of said fractional owned aircraft and potential aircraft passengers that have registered as members of the managed group; said database having data entries on the database that include:

(i) a list of fractional owners of one or more aircraft; and (ii) account information associated with management group members;

a comparator in the managed system that compares one or more criteria for potential qualified members provided by the fractional owner, said criteria describing the characteristics of an individual that would most preferably be offered available aircraft capacity on the flight booked on said fractional owned aircraft by the owner, against information submitted by the members of the management group so the management system can determine which selected subset of members of the managed group are notified about available capacity on the flight booked on the fractionally owned aircraft;

an interactive processor that reviews the results obtained from the comparator and prepares communication transmissions from the management computer system to said selected members, said communication transmissions offering the selected members available aircraft capacity on the specified flight reserved by the fractional owner without transmitting communications to every member of the managed system; said processor on the management system processes a response from one or more of said selected members indicating their desire to occupy said available capacity on said flight reserved by the fractional owner.

37. The system according to claim 36, wherein member information includes electronic contact information associated with management group members.

38. The system according to claim 37, wherein the electronic contact information includes at least one of the following: telephone numbers, email addresses, and wireless device addresses.

39. The system according to claim 36, the communication to qualified members includes an anticipated price on a per seat basis set by the fractional owners.

40. The system according to claim 36, wherein the member information includes personal information regarding the member, address information, member location information.

41. A method for operating a management computer system that manages scheduling and capacity on one or more fractional owned aircraft, said method comprising:
providing a management computer system to support management services for one or more fractionally owned aircraft, said management computer system receives the following information electronically:
aircraft identification information regarding one or more fractional owned aircraft to be managed by the management computer system,
owner identification information with owner authorization information, said owner identification information identifying a plurality of owners of each of said one or more fractional owned aircraft, said plurality of owners having shared access and control over each of said one or more fractional owned aircraft, and said owner authorization information allowing the owner to reserve the fractional owned aircraft for a potential flight;
member information including the member name, address information, location information for one or more members of a managed group upon registration of said one or more members with the managed group, each of said members of said managed group being a potential passenger on a future flight using the fractional aircraft to be reserved in the future by said one or more owners,
receiving an electronic booking request by the management computer system from one or more owners of said one or more of the fractional owned aircraft, said management computer system processing the booking request from one or more of said owners to reserve one of the fractionally owned aircraft for a specified flight;
receiving potential passenger criteria information in an electronic form by the management computer system, said potential passenger criteria information is specified by the owner reserving one or more fractional aircraft to describe the characteristics of potential members of the managed group that said owner would most prefer to have the management computer system to offer available aircraft capacity on said fractional owned aircraft reserved by the owner;
comparing on the management computer system one or more criteria for members provided by the fractional owner, said criteria describing the characteristics of an individual that would most preferably be offered available aircraft capacity on the specified flight booked on said fractional owned aircraft by the owner, against member information submitted by the members of the managed group;
determining by the management computer system which members of the managed group being most closely correlated to the personal criteria information submitted by the owner, said closely correlated members being classified as a qualified member that should be notified about available capacity on the specified flight booked on the fractionally owned aircraft;
transmitting a communication from the management system to said selected qualified members, said communication offering the selected qualified members about available aircraft capacity on the flight booked by the fractional owner without transmitting communications to every member of the managed group;
receiving a response by the management system from one or more of said selected qualified members indicating that member's desire to occupy said available capacity on said flight booked by the fractional owner;
coordinating flight support and aircraft capacity of the fractionally owned aircraft by the management computer system to support use of the fractional owned aircraft on the specified flight with the owner of the fractional owned aircraft and one or more selected qualified members being passengers on said specified flight.

42. The method according to claim 41, wherein a billing statement is prepared by the management computer system for the owner and one or more qualified members.

43. The method according to claim 42, wherein the billing statement includes fees on the per seat basis.

44. The method according to claim 41, wherein a billing statement is generated by the management computer system.

45. The method according to claim 41, further comprising:
collecting fees from the individual that traveling on the flight.

46. The method according to claim 41, further comprising:
receiving owner information by the management computer system as a member of the managed group.

47. The method according to claim 46, wherein the members include at least one of an individual and business entity.

48. The method according to claim 41, wherein the aircraft operates under a certificate allowing charging of fees.

49. A method for operating a management computer system for coordinating flights and capacity on one or more fractional owned aircraft each owned by and under the shared control of one or more fractional owners, said method comprising:
providing electronic information to the management computer system regarding the identification of one or more owners of said fractional owned aircraft and a plurality of members of a managed group,
receiving a request from a first fractional owner of one of said fractional owned aircraft by the management computer system to book a specified flight on said fractional owned aircraft, said booking request from one or more of said owners reserves one of the fractionally owned aircraft for the specified flight through the management computer system;
receiving personal criteria for potential passengers from said owner of said fractional owned aircraft by the management computer system;
comparing said personal criteria for potential passengers provided by the fractional owner to the management computer system, said criteria describing the characteristics of an individual that would most prefer be offered available aircraft capacity, against members information of members in the managed group so the management computer system can determine which selected members of the managed group are to be notified about available capacity on the flight booked on the fractionally owned aircraft;

notifying the selected members of the managed group from the management computer system about available capacity on the specified flight;

receiving responses by the management computer system from one or more selected members with an indication that said selected member wishes to use that available capacity on the specified flight;

coordinating the scheduling of the specified flight under command and control of the fractional owner and the occupancy of the fractional owned aircraft by the selected members responding to the request.

50. The method according to claim 49, further comprising:
billing the fractional owner for the shared flight on a per seat basis.

51. The method according to claim 50, wherein the cost of the shared flight for the fractional owner is set by the management computer system.

52. The method according to claim 49, further comprising determining flight time of the shared flight;
apportioning the flight time between one or more of the fractional owners by the management computer system; and
billing the fractional owners based on the apportioned flight time.

53. The method according to claim 49, further comprising operating the aircraft under a certification that permits the allocation of occupancy of aircraft capacity.

54. The method according to claim 49, wherein said notifying includes transmitting an electronic message.

55. The method according to claim 49, wherein fractional owners includes a plurality of members of said managed group.

* * * * *